US011892187B2

(12) United States Patent
Trinh

(10) Patent No.: US 11,892,187 B2
(45) Date of Patent: Feb. 6, 2024

(54) THERMOSTAT DEVICE WITH IMPROVED ENERGY OPTIMIZATION

(71) Applicant: ECOBEE INC., Toronto (CA)

(72) Inventor: Kevin Trinh, Toronto (CA)

(73) Assignee: GENERAC POWER SYSTEMS, INC., Waukesha, WI (US)

( * ) Notice: Subject to any disclaimer, the term of this patent is extended or adjusted under 35 U.S.C. 154(b) by 311 days.

(21) Appl. No.: 17/211,398

(22) Filed: Mar. 24, 2021

(65) Prior Publication Data

US 2021/0302052 A1 Sep. 30, 2021

Related U.S. Application Data

(60) Provisional application No. 62/994,937, filed on Mar. 26, 2020.

(51) Int. Cl.
| | |
|---|---|
| *F24F 11/67* | (2018.01) |
| *F24F 120/10* | (2018.01) |
| *F24F 110/20* | (2018.01) |
| *F24F 11/46* | (2018.01) |
| *F24F 11/00* | (2018.01) |
| *F24F 120/20* | (2018.01) |
| *F24F 110/10* | (2018.01) |

(52) U.S. Cl.
CPC .......... *F24F 11/67* (2018.01); *F24F 11/0008* (2013.01); *F24F 11/46* (2018.01); *F24F 2110/10* (2018.01); *F24F 2110/20* (2018.01); *F24F 2120/10* (2018.01); *F24F 2120/20* (2018.01)

(58) Field of Classification Search
None
See application file for complete search history.

(56) References Cited

U.S. PATENT DOCUMENTS

| | | | | |
|---|---|---|---|---|
| 5,062,276 | A * | 11/1991 | Dudley | F24F 11/46 62/176.6 |
| 5,475,986 | A * | 12/1995 | Bahel | F24F 11/84 62/211 |
| 2014/0222241 | A1* | 8/2014 | Ols | F24F 11/70 700/299 |
| 2014/0319231 | A1* | 10/2014 | Matsuoka | G05D 23/1902 236/51 |

(Continued)

*Primary Examiner* — Kenneth M Lo
*Assistant Examiner* — Istiaque Ahmed
(74) *Attorney, Agent, or Firm* — Perry + Currier Inc.

(57) ABSTRACT

A device such as a smart thermostat is provided for controlling heating and cooling systems. The device is operable to execute an energy control program to control the heating and a cooling systems based upon different control strategies: a first control strategy that compares the at least one temperature setpoint in the programming schedule to the current measured dry bulb temperature to determine whether to engage or disengage the heating and a cooling systems, and a second control strategy that compares the at least one temperature setpoint in the programming schedule to a normalized humidex temperature to determine whether to engage or disengage the heating and a cooling systems, the normalized humidex temperature being the current measured dry bulb temperature modified by historical humidity values to provide an indicator of thermal comfort within the premise.

28 Claims, 15 Drawing Sheets

(56) References Cited

U.S. PATENT DOCUMENTS

| | | | |
|---|---|---|---|
| 2015/0370927 A1* | 12/2015 | Flaherty | F24F 11/58 |
| | | | 703/1 |
| 2017/0205105 A1* | 7/2017 | Adam | E05F 15/71 |
| 2018/0156487 A1* | 6/2018 | Beitelmal | F24F 11/64 |
| 2019/0107309 A1* | 4/2019 | Assouad | F24F 11/523 |

* cited by examiner

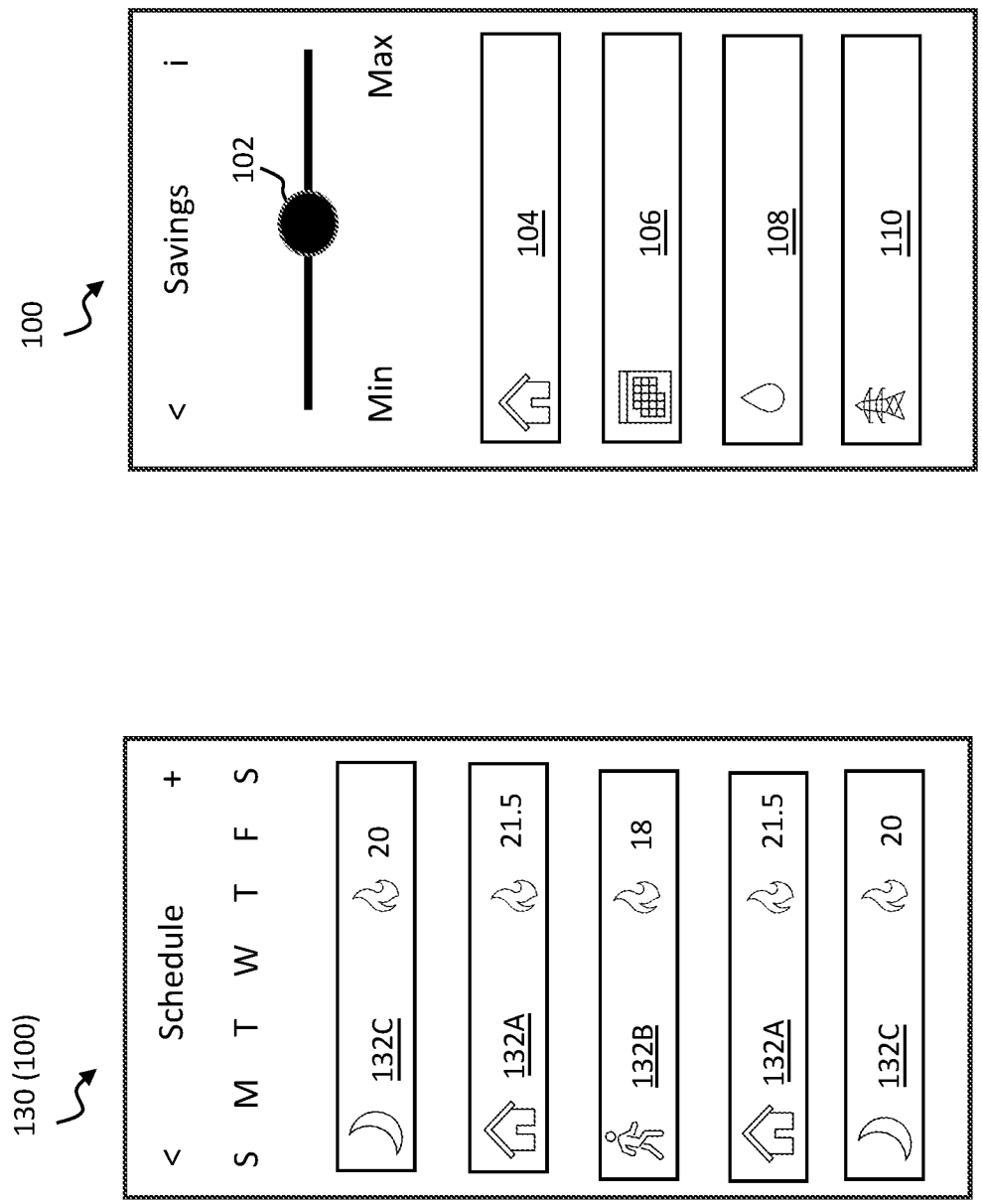

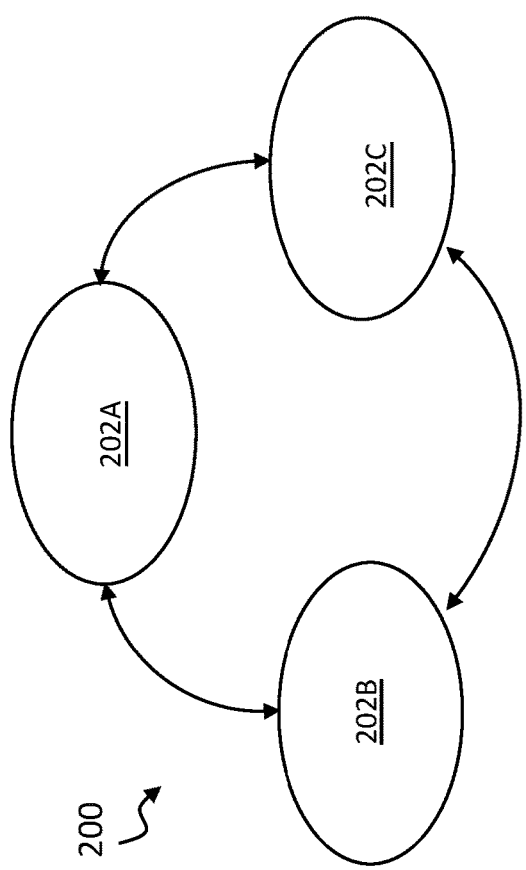
Figure 7A
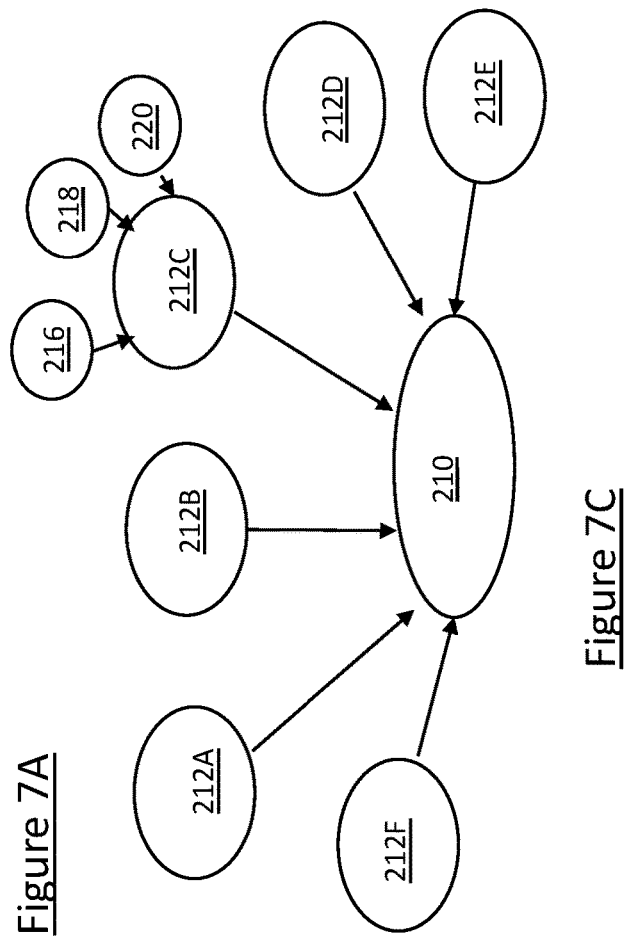
Figure 7C
Figure 7B

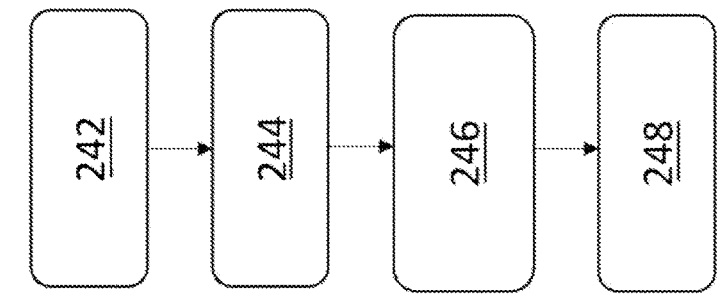
Figure 7F
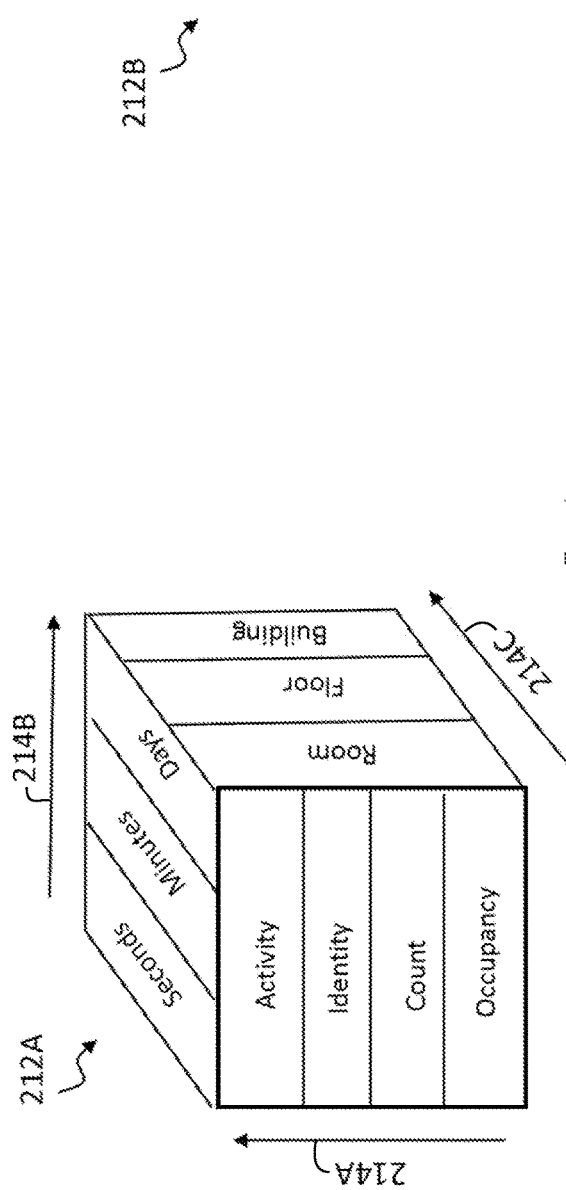
Figure 7E
Figure 7D

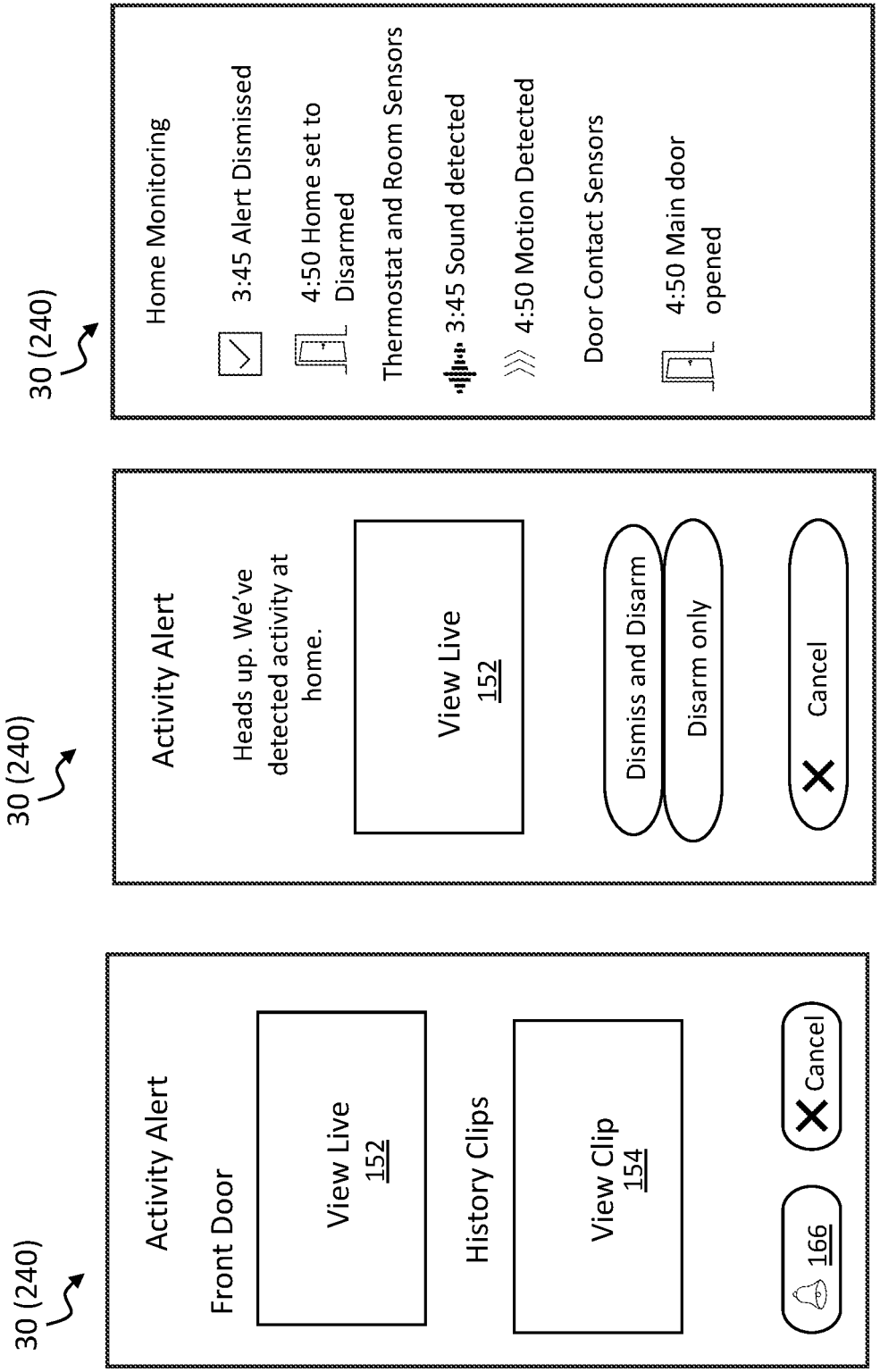

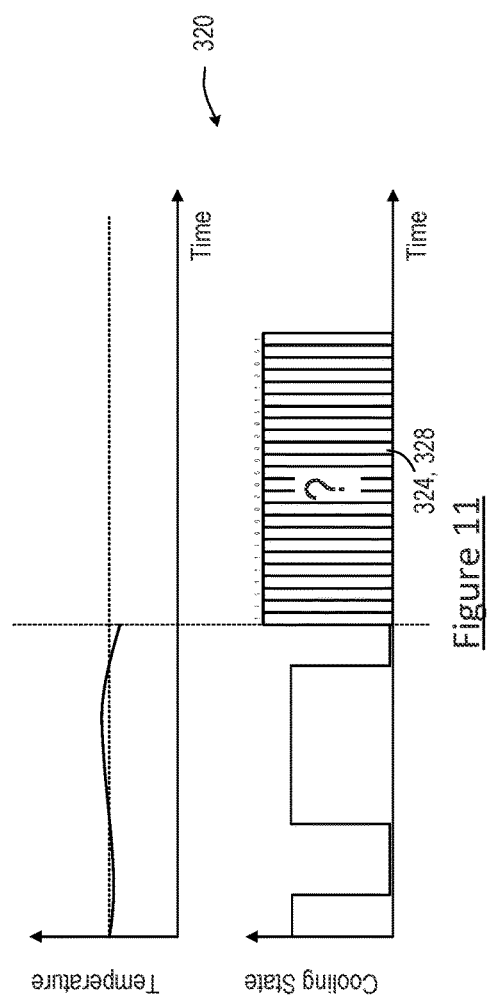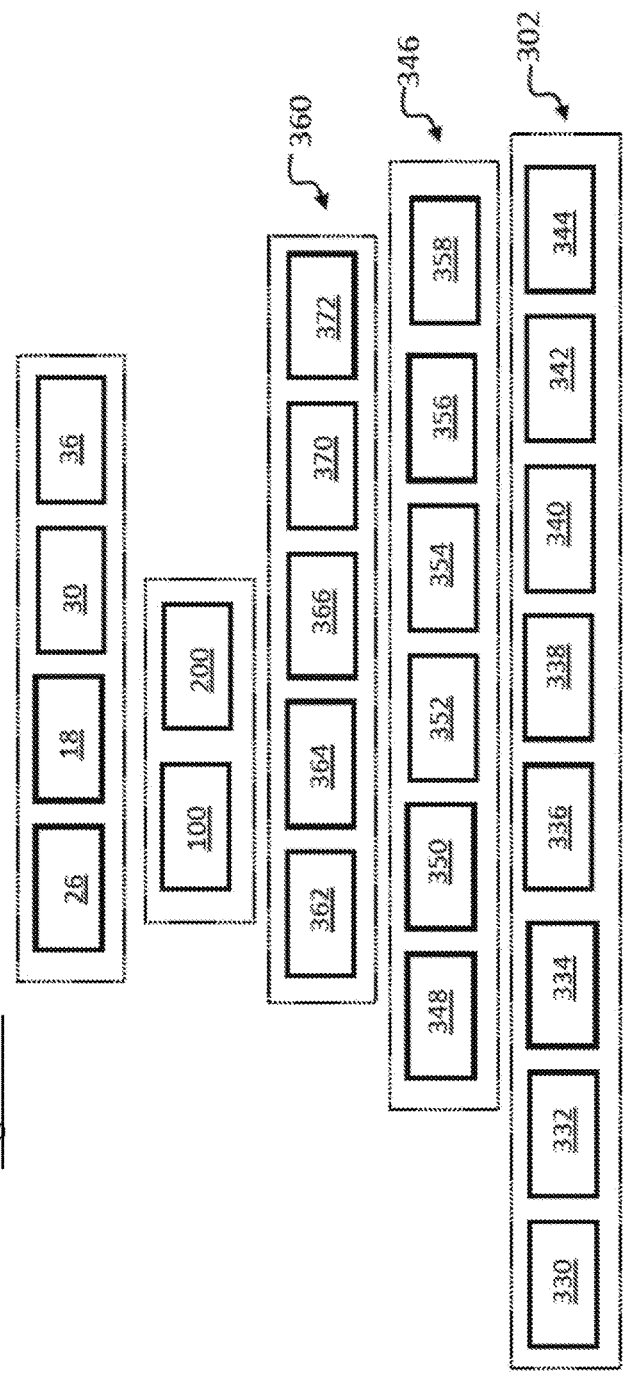

THERMOSTAT DEVICE WITH IMPROVED ENERGY OPTIMIZATION

FIELD OF THE INVENTION

The present invention relates to thermostat devices. More specifically, the present invention relates to Internet-enabled thermostats with enhanced features to reduce energy usage and improve user comfort. In addition, the present invention relates to a home-monitoring system

SUMMARY OF THE INVENTION

It is an object of the present invention to provide a novel thermostat device which obviates or mitigates at least one disadvantage of the prior art.

According to an embodiment of the invention, there is provided a thermostat device for controlling at least one of a heating system and a cooling system within a premise, the device comprising:
  a housing;
  at least one relay within the housing, the at least one relay connected to the at least one of a heating system and a cooling system;
  at least one environmental sensor within the housing, operable to measure the temperature and humidity within the premise; memory, operable to store a programming schedule having at least one temperature setpoint and further operable to store current and historical temperature and humidity values provided by the at least one environmental sensor; and
  a processor, connected to the at least one relay, the at least one environmental sensor and the memory, the processor being operable to execute an energy control program; wherein
  the energy control program is operable to control the at least one of a heating system and a cooling system based upon one of the following control strategies: a first control strategy that compares the at least one temperature setpoint in the programming schedule to the current measured dry bulb temperature to determine whether to engage or disengage the at least one of a heating system and a cooling system, and a second control strategy that compares the at least one temperature setpoint in the programming schedule to a normalized humidex temperature to determine whether to engage or disengage the at least one of a heating system and a cooling system, the normalized humidex temperature being the current measured dry bulb temperature modified by historical humidity values to provide an indicator of thermal comfort within the premise.

BRIEF DESCRIPTION OF THE DRAWINGS

Preferred embodiments of the present invention will now be described, by way of example only, with reference to the attached Figures, wherein:

FIG. 3 shows a program schedule on an energy control program operable to control the thermostat device shown in FIGS. 2A and 2B;

FIG. 4 shows an interface for the energy control program for the thermostat device shown in FIGS. 2A and 2B;

FIG. 7A shows a state diagram for a home monitoring program for the premise shown in FIG. 1;

FIG. 7B shows a schematic representation of the modules contained within the home monitoring program shown in FIG. 7A;

FIG. 7C-7E show models of occupancy resolution for the home monitoring program shown in FIGS. 7A and 7B;

FIG. 7F show a flow-chart for sound based monitoring for the home monitoring program shown in FIGS. 7A and 7B;

FIG. 8C-8E shows a home monitoring remote application for a remote device, the home monitoring remote application being adapted to remotely control the home monitoring program shown in FIGS. 7A and 7B;

FIG. 11 shows an illustration of the prediction-based autopilot shown in FIG. 10, optimizing the future HVAC runtime within premise 10; and FIG. 12 shows a schematic representation of the program modules contained within the prediction-based autopilot program shown in FIG. 10.

DETAILED DESCRIPTION OF THE INVENTION

Figure 1:
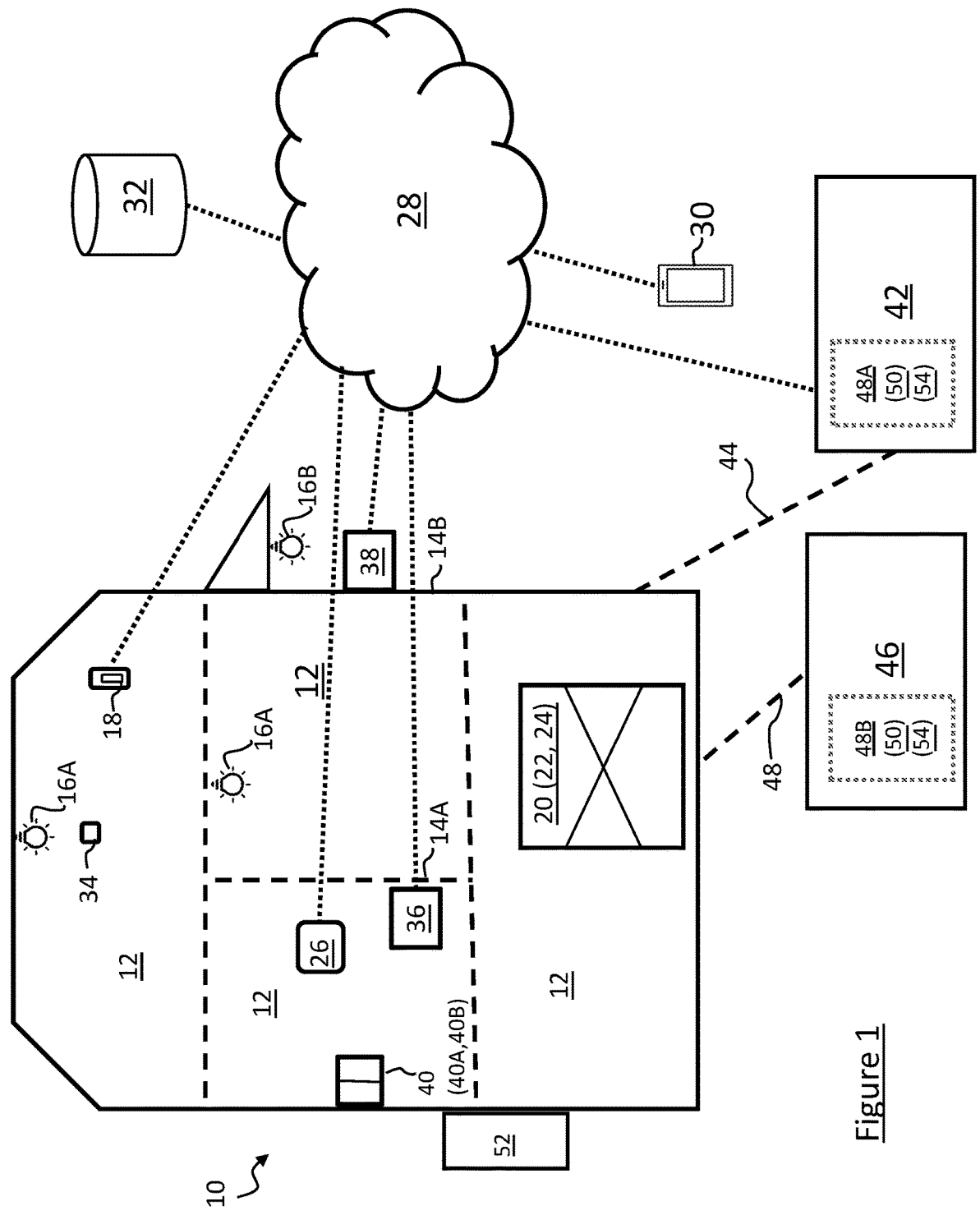
FIG. 1 shows a schematic representation of a premise containing a thermostat device with improved energy optimization.

Referring now to FIG. 1, a premise is shown generally at 10. Premise 10 is typically a residential home, but in some embodiments, could also be a commercial building. Premise 10 is defined by and subdivided into multiple rooms 12 (functionally, the kitchen, bedroom, hallway, etc.) by a plurality of walls 14. Some walls 14 are interior walls 14A (including both load-bearing and non-load bearing walls) and some are exterior walls 14B (thicker load-bearing walls, preferably well insulated). For simplicity, other features of premise 10 such as doors, windows, stairs, etc. have been omitted from FIG. 1. Premise 10 includes a plurality of smart devices, which can be considered either "hub" devices or "remote" devices. While not a strict delineation, hub devices have robust power supplies, communication and computational abilities, whereas remote devices have constrained power, communication and computational abilities. As will be described in greater detail below, remote devices communicate with each other and/or hub devices locally within premise 10, whereas hub devices are also operable to communicate with remote servers outside of premise 10. In the present embodiment, hub devices include a smart thermostat 26, a smart light switch 18, a smart camera 36 and a smart doorbell 38. Remote devices in the present embodiment include remote sensors 34 and contact sensors 40. Other remote devices such as sirens (not depicted) and leak sensors are also contemplated. Collectively, the hub and remote devices support a plurality of home automation applications, such as an energy control program 100, a home monitoring program 200 and a predictive autopilot program 320. Although energy control program 100, home monitoring program 200 and predictive autopilot program 320 are referred to separately herein for clarity, those of skill in the art will recognize that the three programs can be combined into a single, fully featured program having energy optimization, home monitoring and autopilot control of the hub and remote devices within premise 10.

Lighting in each room 12 is preferably provided by a room light 16. Room light 16 can include individually socketed light bulbs, pot lights, fluorescent lighting, etc. Room lighting includes both interior room light 16A, as well as external lighting 16B (porch lights, flood lights, etc.). Control of room light 16 is provided by smart light switch(s) 18. Depending on the electrical wiring for each room 12, each set of room lights 16 may be controlled by one or more smart light switch(s) 18, which may be single pole, dual pole, etc. Preferably, each smart light switch 18 is equipped with wireless communication protocols such as Wi-Fi or Bluetooth to connect to a network 28 to provide for remote control of smart light switch(s) 18 from a remote device 30, which is typically a smart phone, smart watch, tablet or personal computer.

Premise 10 further includes a HVAC system 20, which may include various heating and cooling systems furnaces, air conditioning systems, fans, heat pumps, humidification/dehumidification systems and the like. In the illustrated example, HVAC system 20 includes a heating system 22 (such as a furnace or base-board heaters) and a cooling system 24 (such as an air conditioning system.) HVAC system 20 is preferably controlled by smart thermostat 26.

Network 28 can include a local area networks (LAN) as well as connectivity to the Internet via a router (not depicted) or communication over a cellular network. Network 28 can also include mesh networks that faceplate communication between hub and remote devices. The remote devices 30 may communicate with the smart light switch 18 directly on same network 28 or indirectly via a remote server 32 across the Internet. As mentioned previously, remote devices 30 can include smart phones, smart watches, tablets as well as personal computers. These remote devices 30 can control hub devices such as smart thermostat 26, smart light switch 18 or smart camera 36 via an application or HTML-based web application (such as smart camera application 150 or home monitoring remote application 240).

In many embodiments, remote server 32 acts as an intermediary between the remote device 30 and the hub device within premise 10, and routes information and commands between the two. In addition, remote server 32 may provide additional functionality (in the form of Software as Service, or SaaS), such as energy modeling, computationally intensive machine learning, data storage, historical runtime reports, time and weather services, as well as third-party voice processing services such as the Amazon Alexa service. Furthermore, as will be described later, remote server 32 can also be used to provide alerts and notifications to remote devices 30 when they lose connection to the devices within premise 10 (such as Wi-Fi being down) or when power is out in premise 10.

As mentioned previously, smart thermostat 26 is operable to act as a hub device. In the illustrated embodiment, smart thermostat 26 is a wireless communicating thermostat, such as the ecobee3lite or ecobee Smart Thermostat with Voice. Preferably, smart thermostat 26 is equipped with wireless communication protocols such as Wi-Fi or Bluetooth to connect to the network 28 to provide for remote control of smart thermostat 26 from the remote device 30. The remote devices 30 may communicating with smart thermostat 26 directly on same network 28 or indirectly via the remote server 32 across the Internet.

Smart thermostat 26 is further in wireless communication with a one or more remote sensor(s) 34, which can provide different sensor readings such as occupancy, temperature, humidity, as well as CO or $CO_2$ values to smart thermostat 26, which can communicate wirelessly (via wireless protocols such as 802.11, Bluetooth, Zigbee HA or through a proprietary 900 MHz protocol). Smart thermostat 26 is operable to communicate with remote sensor(s) 34 to provide occupancy and temperature averaging for its readings, and then prioritize temperature values in rooms 12 where occupancy is detected, and/or reduce the usage of HVAC system 20 when no occupancy is detected within premise 10 for an extended period of time. Examples of the 'smart away' functionality is described in greater detail below. Smart thermostat 26 may also include its own occupancy sensor. Preferably, smart thermostat 26 also includes a microphone and speaker.

Figure 2B:
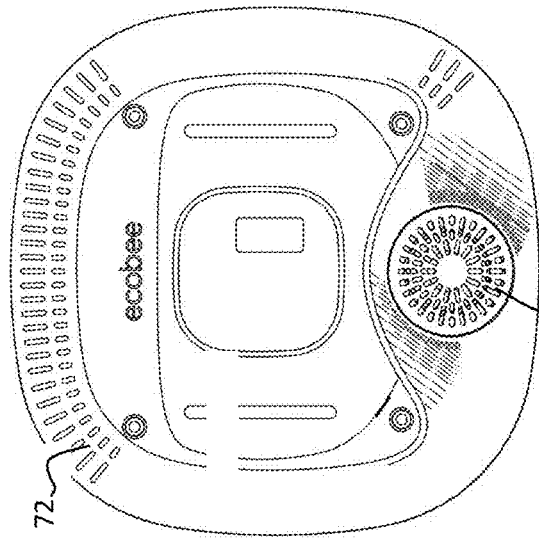
FIG. 2B shows a rear view of the thermostat device shown in FIG. 1.
Figure 2A:
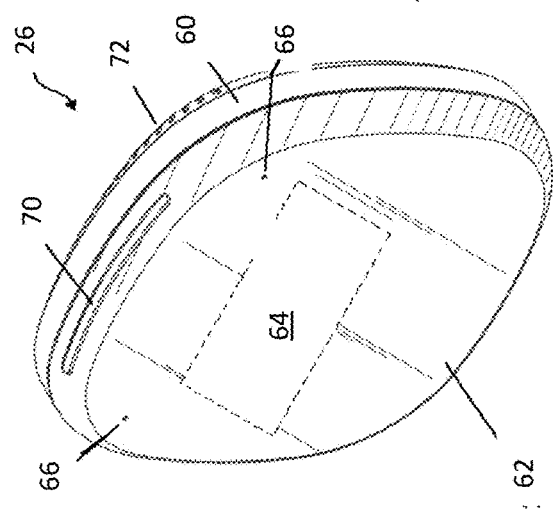
FIG. 2A shows a perspective view of the thermostat device shown in FIG. 1.
Figure 2C:
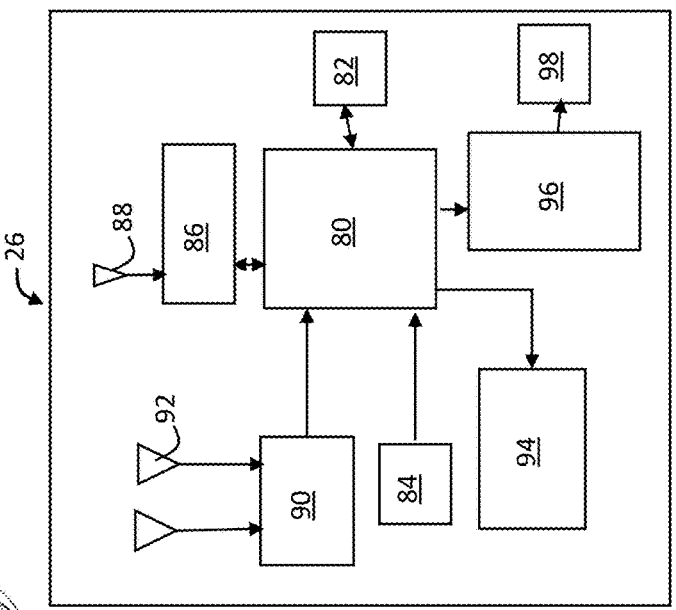
FIG. 2C shows a schematic representation of the components of thermostat device shown in FIGS. 2A and 2B.

Referring now to FIGS. 2A, 2B and 2C, smart thermostat 26 is described in greater detail. Smart thermostat 26 comprises a housing 60 with a front face 62 that includes at least a portion which is transparent and through which a touchscreen 64 can be viewed and interacted with. Front face 62 can also be equipped with a motion sensor (not shown), which can be used as an occupancy sensor 34 to detect a user's presence and/or proximity to smart thermostat 26.

Touchscreen 64 can display a wide variety of information, including the measured temperature, temperature setpoint, heating or cooling mode, outside weather data, operating messages, command response text, icons, controls and menus. Touchscreen 64 further can operate as the user interface for energy control program 100, home monitoring program 200 or predictive autopilot program 320, and can receive inputs from a user to vary operation of smart thermostat 26 if desired. Smart thermostat 26 further includes a pair of spaced microphone apertures 66 which allow sounds from outside housing 60 to reach one or more internal microphones (described below) and a speaker grate 68 which allows sounds emitted from an internal speaker (discussed below) to exit housing 60. Smart thermostat 26 further includes an activity indicator 70, which can be a light pipe driven by one or more LEDs, a lamp assembly, etc. Spaced around the device are plurality of cooling vents 72 operable to vest waste heat from the thermostat.

FIG. 2C shows a block diagram of the internal hardware of smart thermostat 26, which includes a processor 80, which can be a microprocessor, or any other suitable device as will occur to those of skill in the art. Processor 80 is capable of running at different clock rates, to match available program execution rates to computational needs, which can change from time to time. Such multi rate processors are well known. Smart thermostat 26 further includes memory 82, which can be non-volatile RAM and/or volatile RAM which is accessible by processor 80. As will be apparent to those of skill in the art, memory 82 can be integral with processor 80, or can be separate discrete devices or components, as desired. Typically, memory 82 will store one or more programs for execution by processor 80 (such as the energy control program 100 or home monitoring program 200), as well as various parameters relating to the execution of the programs and data and working values required by the programs.

Touchscreen 64 is operatively connected to processor 80, as is the motion sensor (if present), and smart thermostat 26 further preferably includes a real time clock, either as a service provided in processor 80, or as a separate component (not shown).

Smart thermostat 26 can also include at least one environmental sensor 84, which at a minimum is a temperature sensor (operable to determine the current measured dry bulb temperature ($T_{measured}$) within premise 10, namely $T_{measured}$), but can also include other environmental sensors, such as a humidity sensor (operable to calculate absolute and/or relative humidity), ambient light sensor, magnetic compass, GPS receiver, etc. which determine respective environmental conditions to be controlled and/or monitored. Typically, when smart thermostat 26 is an HVAC controller, environmental sensors 84 in smart thermostat 26 will include at least both a temperature sensor and a humidity sensor.

A communication module 86 connected to processor 80 to allow processor 80 to communicate with network n28 (i.e., the Internet) and/or with additional external sensors or computerized devices (not shown). Preferably, communication module 86 is operable to connect to the desired data networks wirelessly, via an antenna 88, using at least one wireless communication protocol, such as Wi-Fi; Bluetooth; ZigBee; ZWave; Cellular Data, etc., but it is also contemplated that communication module 86 can have a wired connection to the data networks, such as via an Ethernet connection.

Communication module 86 also allows smart thermostat 26 to communicate with Internet based services running on remote servers 32 (such as weather servers, remote monitoring systems, data logging servers, voice processing services, etc.) and with applications used remotely by users of smart thermostat 26 to monitor and control the controlled premises' environmental state or other conditions. For example, a user remote from smart thermostat 26 may access an application executing on a smartphone (remote device 30) or personal computer to send commands to smart thermostat 26, via the Internet or other data communications network or system, to alter the operation of smart thermostat 26 or a system it is controlling.

Smart thermostat 26 further includes a secondary processor 90, which is capable of digitizing and processing, as described in more detail below, audio signals received from at least one, and preferably two or more, microphones 92. In the present embodiment, secondary processor assembly 90 is a DSP (digital signal processor) which can receive inputs from microphones 92 (which are located within housing 60 adjacent microphone apertures 66), digitize them and perform signal processing operations on those digitized signals in accordance with one or more programs stored within the DSP. While the current embodiment employs a single device DSP with the required capabilities, it is also contemplated that secondary processor 90 can be constructed from two or more discrete components, if desired. It is also contemplated that secondary processor 90 can be a separate computational core, or cores, included in processor 80.

Smart thermostat 26 further includes a peripheral control block 94, which can be connected to one or more control lines for a system to be controlled by smart thermostat 26, such as an HVAC system 20, or other systems such as garage door opener, lighting system, etc. and peripheral control block 94 can receive signals from the connected systems (such as the HVAC system 20) and/or output control signals thereto in accordance with one or more programs executed by processor 80.

Peripheral control block 94 can include mechanical, or solid state, relays to provide outputs to control lines, as well as a MUX or other suitable devices for receiving relevant input signals from the HVAC or other controlled system and providing those signals to processor 80.

The hardware on smart thermostat 26 further includes an audio output subsystem 96, which is operable in response to signals received from processor 80, to output an amplified audio signal to a speaker 98 (which is arranged to output sound through speaker grate 68). Audio output subsystem 96 can be a discrete device, or combination of suitable discrete devices, as desired and is preferably capable of outputting voice signals and/or music or other sounds.

User inputs to smart thermostat 26 can be achieved via network 28-connected applications running on remote devices 30, via touchscreen 64 and/or responses from cloud-based processing of voice commands received from the remote processing service by smart thermostat 26. When smart thermostat 26 also serves as a voice command input device for such commands, a user's spoken voice commands are received by microphones 92 and, as is described in more detail below, a representation of that received audio is transmitted by smart thermostat 26 over network 28 to the remote processing service on a remote server 32. The remote processing service receives the transmitted representation of the audio and determines the meaning of the spoken voice commands and prepares an appropriate response which is then returned to smart thermostat 26 for execution, or otherwise processed by another device or service.

Depending upon the range of services offered by the remote voice processing service, the response to a spoken voice command can be selected from a wide range of responses. For example, the remote processing service may have a limited set of available responses, all directly related to the control and operation of smart thermostat 26, i.e.—the voice command could have been a request to raise the temperature of the environment controlled by smart thermostat 26, when serving as an HVAC controller, by one or more degrees and the response returned by the remote voice processing service in such a case would be the necessary program commands for smart thermostat 26 to raise its target temperature by the one or more degrees the user commanded, along with an audio stream of a voice confirmation.

In a more preferred embodiment, the remote voice processing service is a broadly capable system, such as the above-mentioned ALEXA Voice Service, and the voice commands which can be processed range far beyond those specifically related to the control and operation of smart thermostat 26. For example, a user can ask for the current time and the remote voice processing service will return an audio stream of a voice saying the current time to smart thermostat 26, along with the program commands necessary to have that audio stream played to the user through speaker 98.

Similarly, the user may order fast food, such as a pizza, by voice command to smart thermostat 26 and the remote voice processing service will complete the order, perhaps through an interactive set of audio exchanges with the user through microphones 92 and speaker 98 or in accordance with predefined settings (size of pizza, toppings, payment method, etc.) previously defined by the user, and will forward the resulting order through network 28 to the pizza supplier while confirming the same to the user via an appropriate audio voice stream output at smart thermostat 26.

In this regard, computerized smart thermostat 26 can perform many or all of the functions of a voice command input device such as the Amazon Echo device, typically used to interact with the ALEXA voice service, or the corresponding Google Home device and service, etc. in addition to performing its other control functions, such as regulating temperature and/or humidity in an environment.

Smart thermostat 26 is adapted to control HVAC system 20 via an energy control program 100. One component of energy control program 100 is a programming schedule. In the present embodiment, the programming schedule can be set on either the touch screen 64 of smart thermostat 26 or on the remote device 30. An example of a program schedule as displayed on the remote device 30 is shown in FIG. 3 generally at 130. Programming schedule 130 is preferably a seven-day schedule, where each day has one or more schedule periods 132 (such as a HOME period 132A, an AWAY period 132B, a SLEEP period 132C, etc.), where each schedule period may have different temperature setpoints ($T_{setpoint}$), and specifically different heating and cooling setpoints ($T_{setpoint\_heat}$ and $T_{setpoint\_cool}$).

As mentioned previously, smart light switch 18 is another hub device, and includes similar hardware as smart thermostat 26, including processors, memory, occupancy sensing, a microphone and a speaker. Remote server 28 may provide additional functionality (in the form of Software as Service, or SaaS), such as energy modeling, historical runtime reports, time and weather services, as well as third-party voice processing services such as the Amazon Alexa service. Smart light switch 18 is adapted to run a smart lighting schedule (not shown) similar to the programming schedule, which determines when lights 16 will turn on or off, and possibly the colour or intensity of those lights 16. It is contemplated that the scheduling of the smart lighting schedule may be linked to the schedule periods 132 on programming schedule 130.

As mentioned previously, premise 10 may include additional hub devices such as smart camera 36 and smart doorbell 38. Smart camera 36 includes similar hardware as smart thermostat 26, including processors, memory, occupancy sensing, indicator lights, a microphone and a speaker. Smart camera 36 also includes a digital camera for live and recorded video, and preferably IR lights for night-time recording. Smart camera 36 preferably includes an occupancy/motion sensor so that it starts streaming or recording whenever motion is detected. The processor in smart camera 36 is preferably operable to provide facial recognition services to recognize authorized household persons. It is contemplated that a user-configurable privacy setting will allow household persons to disable the video and recording of recognized household persons. Alternatively, the privacy mode could have live video and recording could be disabled while home monitoring program 200 (described in greater detail below) is in either their Disarmed or Armed Stay settings. Smart Camera 36 can also provide two-way communication between itself and other hub devices (as an intercom) or remotely with an app running on remote device 36. Privacy mode could also be activated by a physical "mute" button on the smart camera 36. Preferably, smart camera 36 includes hardware and software for voice control (as is described above with respect to smart thermostat 26) and auto-tracking.

Figure 5C:
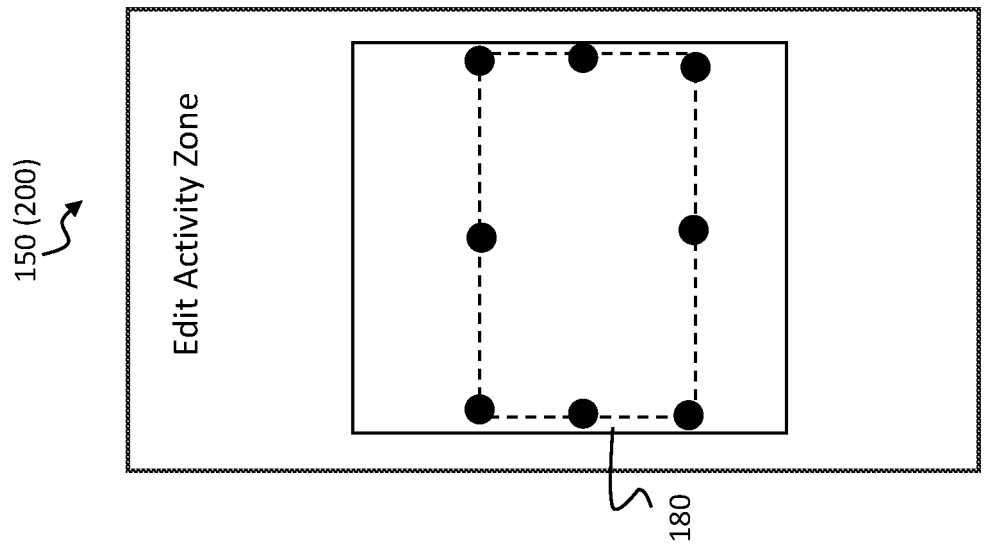
FIG. 5C shows configuration of an activity zone for the remote camera application shown in FIG. 5A.
Figure 5B:
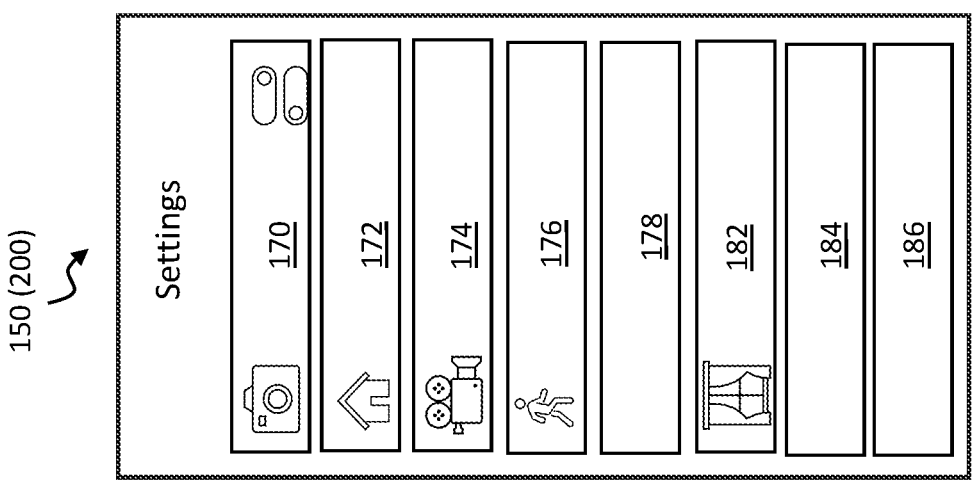
FIG. 5B shows configuration options for the remote camera application shown in FIG. 5A.
Figure 5A:
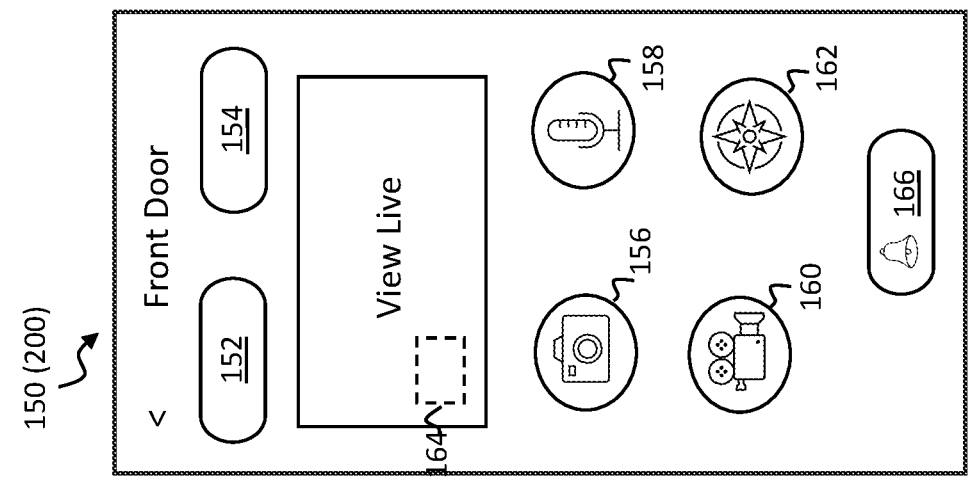
FIG. 5A shows a remote camera application for a remote device, the remote camera application being adapted to control a camera device shown in FIG. 1.

Referring now to FIG. 5A, a remote camera application running on a remote device 30 is shown generally at 150. Although remote camera application 150 is referred to separately here for convenience, those of skill in the art will recognize that remote camera application 150 can be integrated as part of home monitoring program 200. Remote camera application 150 includes several features such as live video streaming 152 (where a live video feed from smart camera 36 is streamed across network 28), as well as the ability to play previously recorded video clips (History 154), where recorded video clips stored on remote server 32 are transmitted across network 28. In addition, the user may take instant snapshots 156 (to be stored on remote server 32), engage the microphone and speaker to provide two-way conversation (Talk 158) across network 28, initiate the recording of video clips (Record 160), pan around the wide-angle lens (Pan 162), or switch to Widescreen mode 164. In addition, the user may manually trigger a siren 166. The sound of siren 166 can be provided by the speaker of smart camera 36. In addition, the speakers of other connected hub devices (such as smart light switch 16 and smart thermostat 26), or a dedicated remote siren device (not depicted) can also be engaged to amplify the speaker effect.

Referring now to FIG. 5B, some of the configurable options of smart camera 36 are shown. These configurable options include Camera On/Off 170 (to manually engage or disengage smart camera 36). Autopilot 172, when engaged will turn smart camera 36 on when all authorized users have left premise 10 and turn smart camera 36 off when at least one authorized user is or has arrived at premise 10. The location of authorized users can be determined by geofencing on their remote device 30. The capabilities of autopilot 172 and additional means of determining occupancy for smart camera 36 are described in greater detail below with reference to home monitoring program 200. With the configurable option Event Recording 174, smart camera 36 can be configured to automatically record events when either motion is detected in the field of view of smart camera 36 and/or when a person is detected in the field of view of smart camera 36. With the configurable option Motion Sensitivity 176, the motion sensitivity of smart camera 36 can be adjusted to reduce the possibility of false detections for event recording 174. With the configurable option Activity Zone 178, a motion detection zone 180 (FIG. 5C) can be defined or shaped within the field of view. Smart camera 36 will send notifications to remote device 30 whenever motion is detected in the motion detection zone 180 and will ignore the portion of the field of view that is outside of the motion detection zone 180. The configurable option Window mode 182 will selectively disable the IR lights on the camera to remove glare, allowing smart camera 36 to see clearly through glass at night. Under the configurable option Device Settings 184, a user can configure other options for smart camera 36 such as setting a custom name, reconfiguring the wi-fi connection, or resetting the smart camera 36. With the configurable option Link 186, the user can connect the smart camera 36 to voice control services such as Amazon Alexa, allowing for additional control of the smart camera 36, as well as general access to the capabilities of the voice control service (as is described above).

Smart doorbell 38 offers many of the similar features as smart camera 36, including microphones, speakers, a digital camera and IR lighting, motion sensing. The camera can be triggered to record video upon motion sensing or when the doorbell is pressed (configurable setting). As with the other smart devices, smart camera 36 and smart doorbell 38 are connected to network 28 and thus to remote server 32. By defining a motion detection zone, functionality such as package delivery detection can be enabled, whereas other motions (such as people walking on the sidewalk, or vehicle traffic on the road) will be ignored.

As described earlier, premise 10 may include remote sensors 34, which can provide different sensor readings such as occupancy, temperature, humidity, as well as CO or CO2 values to smart thermostat 26 via local wireless communication. Each remote sensor 34 includes a housing, a temperature sensor, a humidity sensor, an occupancy sensor (as well as an optional air quality sensor, processor with memory, a wireless transceiver and a battery. As part of the energy control program 100 and home monitoring program 200, each remote sensor 34 can be provided with a user-based identifier (such as "master bedroom" or "basement"). Remote sensors 34 can transmit regular environmental readings ("temperature change event", "humidity change event"), etc., on a regular schedule or whenever a change is detected. Thus, remote sensors 34 can keep temperature comfortable by managing hot or cold spots in the house. The occupancy sensor in remote sensor 34 typically is a PIR. When the occupancy sensor detects presence or motion, it will immediately transmit its occupancy reading to the hub devices (i.e., an "occupancy event" or a "motion event"). Preferably, the occupancy sensor can be calibrated to ignore small pets and avoid false positive readings. Remote sensors 34 are used to provide advanced temperature control such as "Follow me" and "Smart Away". "Follow me" prioritizes temperature readings in rooms where occupancy is detecting to ensure users stay comfortable and minimize unnecessary runtime to condition rooms where no occupancy is detected.

Furthermore, premise 10 may also include contact sensors 40. In addition to the hardware and features of remote sensors 34, contact sensors 40 are able to detect the opening/closing of doors or windows within the home. Contact sensors 40 are operable to wirelessly pair with other "hub" devices such as smart thermostat 26 and smart camera 36. In the presently illustrated embodiment, each contact sensor 40 includes a base portion 40A and a magnet portion 40B and is operable to detect the distance between portions 40A and 40B, and are thus able to detect different types of door/window openings such as swinging and sliding. Both occupancy detection and ("occupancy event") open/close states ("open event" and "closed event") are immediately transmitted to the hub devices. It is contemplated that registered users of the home monitoring program 200 can designate contact sensors 40 as "door" sensors 40 or "window" sensors 40 using their home monitoring remote application 240, as this will allow for differing treatment based upon usage cases. Preferably, contact sensors 40 include temperature sensors (similar to remote sensors 34). In this case, contact sensors 40 are well placed to detect drafts and leaks.

Energy Optomization

Returning now back to FIG. 1, electrical power to premise 10, and its various systems (such as smart light switches 18, but especially HVAC system 20) is provided by an electrical utility 42 over transmission network 44. For some premises 10, where heating system 22 is provided by fossil fuels such as natural gas, supply of that fossil fuel is provided by a fuel utility 46 via a pipeline network 48.

In order to provide service to premise 10, electrical utility 40 will require at least one person (typically the owner of premise 10) to have a utility account 48A. Conversely, fuel utility 44 will require at least one person (typically the owner of premise 10) to have a utility account 48B. Each of utility account 48A and 48B will have a unique account number associated with the account owner and the address of premise 10. The utilities 42 and 46 will also be able to track energy consumption at premise 10 via meter data 50, collected from a meter 52 on the premise 10, and associate that energy consumption with the utility account 48A or 48B for the purposes of billing. Also associated with utility accounts 48A and 48B is the user's selected rate plan 54.

While rate plans 54 have traditionally included a simple energy cost (such as the cost per KWh or cost of a cubic volume of natural gas), current rate plans can be significantly more complex and offer features such real-time energy billing rates, as time of use (TOU) rates, incline block rates and features such as load shedding or demand response agreements. In addition to permanent features, utilities may encourage customers to participate in seasonal demand response programs, often by providing economic incentives.

Devices such as smart thermostat 26 can play a key role in a utilities demand response program. When a customer in premise 10 chooses to participate in the demand response program, their smart thermostat 26 can reduce energy consumption by applying a temperature setback or by duty-cycling their pertinent HVAC system 20. In some embodiments, utility 44 is able to send a signal to smart thermostat 26 (via remote servers 32) about a current or future DR event. Control can be provided through a proprietary DRMS system, a utility portal or through an open protocol such as OpenADR 2.0. Furthermore, smart thermostat 26 is able to report data back to the utility, such as participation rates (Opt In/Out for optional Dr events) and assist in a utility's EMV requirements. While many customers are motivated by energy savings and additional economic incentives, overall participation in these demand response programs is typically quite low. Customers often cite program complexity, difficulty of registration, and fear of discomfort as reasons for not participating in their utility's demand response program.

Referring now to FIG. 4, a program for controlling a home's energy usage and enhancing energy optimization is shown generally at 100. Energy control program 100 is operable to run directly on smart thermostat 26, or alternatively, may also be run remotely on remote device 30. Energy control program 100 includes program schedule 130 (FIG. 3), but in the current embodiment, includes savings adjuster 102, occupancy program 104 (i.e., "smart home & away"), schedule assistant 106, feels like setting 108 and community energy savings 110.

Occupancy program 104 is a feature which reduces energy consumption by applying a setback to the temperature setpoint when premise 10 is deemed to be unoccupied. In the present embodiment, occupancy program 104 determines the probability ("prob_occcupancy", being a value between 0 and 1) that premise 10 is occupied based upon recent motion detection events generated by remote sensors 34. When remote sensors 34 have recently detected motion, premise 10 is deemed occupied and when no motion has been recently detected, premise 10 is deemed unoccupied. Alternatively, prob_occcupancy could be determined by the current arm state of home monitoring programs 200 (i.e., Armed Away or Disarmed, as is described below). When premise 10 is occupied, smart thermostat 26 will rely upon either the setpoint associated with Home period 132A or Sleep period 132B (depending on the hour) and when premise 10 is unoccupied, smart thermostat 26 will rely upon the setpoint associated with Away period 132B.

Schedule assistant 106 is a tool which provides recommendations to the user to modify their programming schedule 130 based upon historical occupancy data received from remote sensors 34 (and stored on remote servers 32). For example, schedule assistant 106 may notice that a user has scheduled Home period 132A beginning at 5:00 pm each weekday, but that over the past three weeks, there is no occupancy detected in premise 10 until at least 5:15 each weekday. Thus, schedule assistant 106 will recommend to the user to modify their programming schedule so that Home period 132A begins at 5:15 pm on weekdays. Alternatively, a user may schedule their Sleep period 132C to begin at 11:00 pm on weekdays, but schedule assistant 106 has noticed over the past two weeks frequent activity (as observed by remote sensors 34) until at least 11:30 pm. In this case, schedule assistant 106 may recommend that Sleep period 132C begins at 11:30 pm.

Community energy savings 110 is a feature that allows the user to automatically participate in demand response events issued by their electrical utility 42 (and in some cases, their fuel utility 46). When the user's utility 42 issues a demand response event, the event is transmitted to smart thermostat 26 over network 28 via remote server 32, and the smart thermostat 26 applies a setback to the temperature setpoint. Preferably, the user's utility 42 will automatically be informed that the user has turned community energy savings 110 (again, via remote server 32) on and know that this smart thermostat 26 is an available curtailment resource for an upcoming demand response event. In some cases, community energy savings 110 will automatically enroll the user in the utility 42's demand response program and transit the necessary enrollment data to the utility. In cases where the user must accept additional terms and conditions relating to the utility 42's demand response program, the user will be able to select "Accept" or "Decline" on their touchscreen 64 or on their remote device 30 using community energy savings 110. Community energy savings 110 may also show the user upcoming demand response events and allow a user to opt out of non-mandatory demand response events. In some instances, community energy savings 110 may also provide the customer with information about rebates and other incentives relating to the utility 42's demand response program.

Savings adjuster 102 provides users with a simple mechanism to adjust the balance in energy control program 100 between aggressive savings and user comfort for features such as occupancy program 104, schedule assistant 106, and community energy savings 110. Depending on the setting of savings adjuster 102, various features of energy control program 100 may be turned on or off. For example, at the lowest setting ("Min"), schedule assistant 106 may be deactivated, at an intermediary setting will require three weeks of occupancy history, and at the highest level ("Max"), may only require one week of occupancy history in order to make a recommendation to change the programming schedule 130. For community energy savings 110, at the lowest setting ("Min"), community energy savings 110 may be deactivated, at an intermediary setting will apply a two-degree setback during a demand response event, and at the highest level ("Max"), will apply a four-degree setback during a demand response event issued by electrical utility 42.

Furthermore, smart thermostat 26 may adopt different setpoint control strategies 112 (i.e., either optimized for user comfort ("Comfort Control" strategy 112A), for energy savings ("SavingControl" control strategy 112B) or somewhere in between based upon the savings adjuster 102 setting. For example, for occupancy program 104, the setpoint control strategies 112 will apply a setback based upon energy control program's estimation of whether premise 10 is currently occupied or unoccupied ("prob_occcupancy). Alternatively, ("prob_occcupancy"). could be determined by the current arm state of home monitoring programs 200 (i.e., Armed Away or Disarmed, as is described below). When premise 10 is occupied, smart thermostat 26 will rely upon either the setpoint associated with Home period 132A or Sleep period 132B (depending on the hour) and when premise 10 is unoccupied, smart thermostat 26 will rely upon the setpoint associated with Away period 132B. Comfort control strategy 112A is a setting which prioritizes user comfort (as a goal function) over cost or energy savings. Thus, it will ensure that HVAC system 20 operates to ensure that the measured temperature ($T_{measured}$) within premise 10 closely matches the temperature setpoint, at least when users are known to be home (high values for prob_occupancy"). Furthermore, in premises 10 that have multiple temperature measurements (such as from smart thermostat 26 and multiple remote sensors 34), it will prioritize user comfort in the rooms 12 of premise 10 where occupancy is detected. Thus, some unoccupied rooms 12 of premise 10 will have their measured temperature ($T_{measured}$) deviate from the temperature setpoint than regions of premise 10 where occupancy has been detected. In cases where premise 10 is deemed to be unoccupied, comfort control strategy 112A will apply a modest setback (for example, two degrees). In contrast, savings control strategy 112B will maximize for a goal function (energy costs) or goal function (energy emissions), even at the risk of some degree of user discomfort. Savings control strategy 112B does not ignore temperature setpoints when users are located within premise 10, but requires a higher degree of confidence that they actually are home than comfort control strategy 112A. Furthermore, savings control strategy 112B will more aggressively move to an Away setting based upon low occupancy values and user a larger setback (for example, four degrees) when premise 10 is deemed unoccupied.

The amount of time (and confidence required) for occupancy program 104 to determine occupancy within premise 10 can be reduced based upon the setting of savings adjuster 102, based upon the probability of occupancy (prob_occupancy) as determined by remote sensors 34. Determining the probability of occupancy is described in greater detail below with respect to home monitoring program 200. For example, in one embodiment of the invention, when savings adjuster 102 is set to:

(Min) Level 1: use Savings Control strategy 112A when prob_occupancy <10%, else use Comfort Control strategy 112B Level 2: use Savings Control strategy 112A when prob_occupancy <20%, else use Comfort Control strategy 112B Level 3: use Savings Control strategy 112A when prob_occupancy <30%, else use Comfort Control strategy 112B Level 4: use Savings Control strategy 112A when prob_occupancy <40%, else use Comfort Control strategy 112B (Max) Level 5: use Savings Control when strategy 112A prob_occupancy <50%, else use Comfort Control strategy 112B When enabled, the feels like setting 108 in energy control program 100 uses a humidex-based controller ("Feels Like Controller 114" or FLC 114) which incorporates humidity readings into the temperature setpoints to better provide perceived comfort. FLC 114 includes both Comfort Control strategy 112A and Saving Control strategy 112A settings that adapt the temperature setpoint used by programming schedule 130 to account for humidity and occupancy within the premise 10. FLC 114 uses the heat index (often called Humidex, "Feels like" or Hx) rather than conventional measurements of dry bulb temperature ($T_{measured}$).

Furthermore, FLC 114 adapts to recent levels of observed relative humidity (RH %) observed in premise 10. In the present embodiment, mean relative humidity (mRH) is an average of measured RH % values calculated over a period of time. FLC 114 maintains a rolling sample of humidity levels (typically three to ten days' worth) to define a daily mean relative humidity (mrH 116). At any moment, FLC 114 defines the humidity scenario ("humid" or "dry") based on the current humidity reading relative to the mrH. mRH allows FLC 114 to adapt to recent levels of observed humidity in premise 10, because average humidity levels in one season (e.g., a rainy spring season) can vary from another (e.g., a dry fall season). Furthermore, people often adapt to changing seasons by adjusting their diets (e.g., cold drinks in the summer vs warm drinks in the winter) and clothing levels (e.g., shorts in the summer, thicker, long sleeves in the winter). As is described in greater detail below, energy control program adjusts the temperature setpoints based upon measured temperature and humidity effectively by adding temperature setbacks or setforwards weighted by the deviation from the current humidity level from the mRH. Thus, the more humid it is, the more of a setforward is applied to overcool premise 10 in order to maintain the expected 'feels like' temperature. The drier the air is within premise 10, the more of a setback is applied, saving energy while maintaining the same 'feels like' temperature.

Figure 6C:
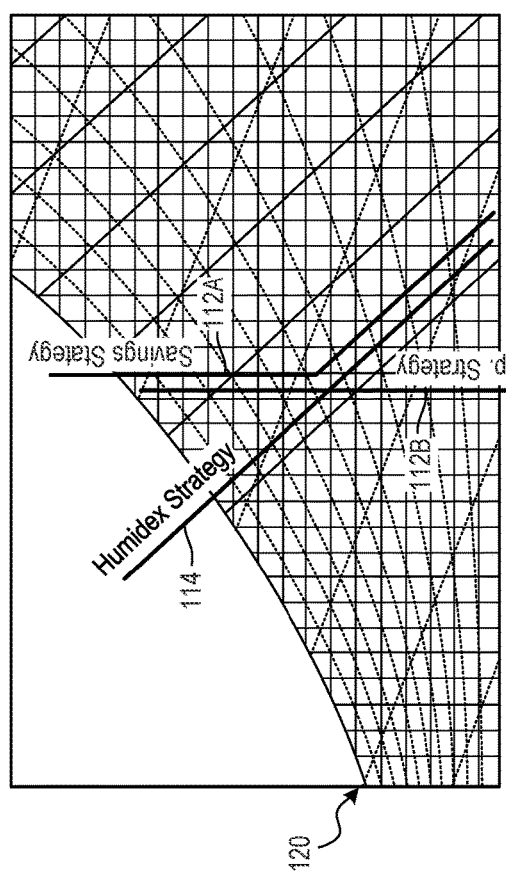
FIG. 6C shows the optimization strategies for the energy control program shown in FIG. 4.
Figure 6B:
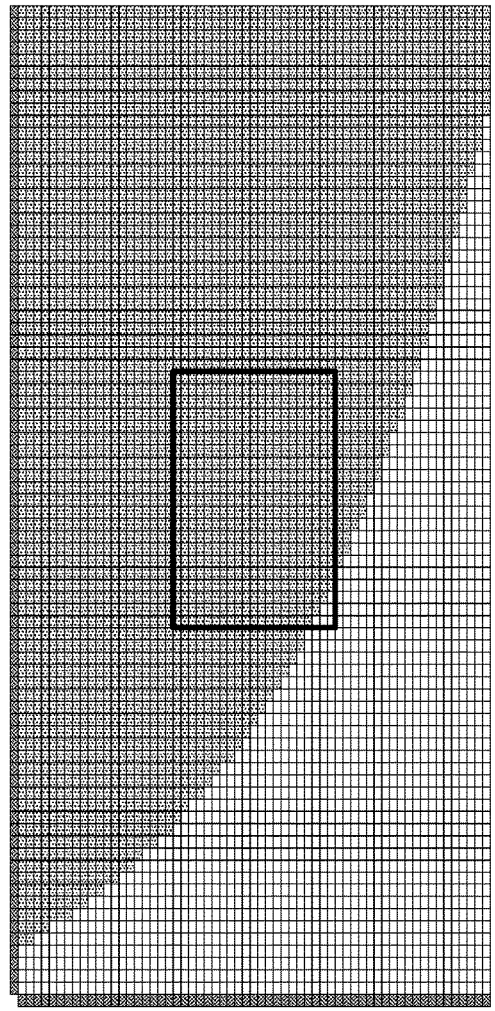
FIG. 6B shows a lookup table for the feels-like controller shown in FIG. 6A.
Figure 6A:
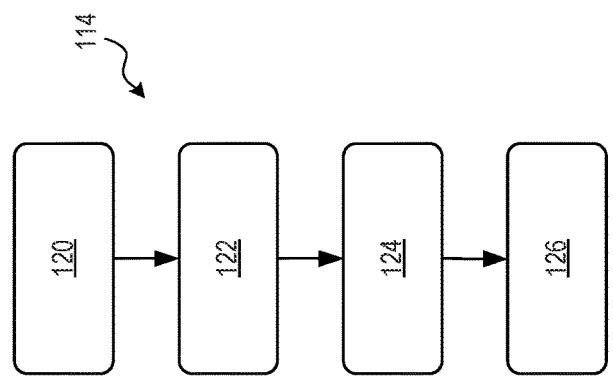
FIG. 6A shows a flow-chart for a 'feels-like' (i.e., humidity-based) controller for the energy control program shown in FIG. 4.

Referring now to FIG. 6A, a flow chart of the control logic of FLC 114 is shown, begging at step 120. At step 120, an indoor humidex value (Hx) is calculated can be normally calculated using the following formula, where $T_{measured}$ is in degrees Celsius:

$$Hx = T_{measured} + (5/9)*(e-10), \text{ where}$$

$$e = 6.112 \times 10^{\wedge}(7.5*T_{measured}/(237.7+T_{measured}))*(\%RH)/100\%$$

% RH is the relative humidity, and is provided directly from the humidity sensor onboard the smart thermostat 26 or on remote sensors 34.

Constraints: When TempC<Hx, then use TempC for the Hx value.

In most embodiments, $T_{measured}$ is a blended value of indoor temperature received from smart thermostat 26 and remote sensor 34. The following table shows examples of different measured temperatures, relative humidity, and an outputted humidex value.

| $T_{measured}$ (Celsius) | $T_{measured}$ (Fahrenheit) | Input Relative Humidity (RH %) | Output Hx |
|---|---|---|---|
| 22.2 | 72 | 40 | 22.61 |
| 22.2 | 72 | 60 | 25.58 |
| 26.7 | 80 | 40 | 28.86 |
| 26.7 | 60 | 60 | 32.74 |

Alternatively, instead of calculating Hx values, FLC 114 could use a lookup table 118 (FIG. 6B) with pre-generated humidex values. In some cases, linear interpolation may be required as well. For example, to calculate the normalized Hx value of a sensor reading with 25 Hx using a mean RH of 60%, an algorithm will need to identify then interpolate between 24.5 (i.e., 21.5 C@60% HX) and 25.2 (i.e., 22.0 C@60% HX).

At step 122, the user-defined temperature setpoints are converted into humidex setpoints. The Humidex setpoint is a function of the current user-defined temperature setpoint (as per programming schedule 130) and the Mean Relative Humidity (mRH). In one embodiment of the invention, RH % values are measured and stored on smart thermostat 26 every five minutes. Calculate the Mean Relative Humidity (mRH) over the past X hours, from RH % values sampled every 5 minutes using the same % RH values that get reported in ISM payloads. Preferably, mRH is a rolling average of measured RH % data, calculated over at least 72 hours. FLC 114 uses a comparatively lengthy calculation period so as to allow users to adapt to changing weather conditions. In some cases, mRH may include up to 240 hours (10 days) worth of averaged, measured RH % data. In cases where energy control program 100 does not have enough RH % values, then it will temporarily disable FLC 114 and instead rely upon Comfort Control strategy 112A and/or Saving Control strategy 112A. To prevent certain extreme events from occurring, the value of mRH is capped at 80%.

Humidex setpoints are calculated using the same way as Hx value, but use mRH instead of RH %, thus:

$$\text{Humidex setpoint} = T_{measured} + (5/9)*(e-10), \text{ where}$$

$$e = 6.112 \times 10^{\wedge}(7.5*T_{measured}/(237.7+T_{measured}))* (mRH)/100$$

Next, a humidex differential under FLC 114 is calculated, the humidex differential being defined as (Humidex setpoint–$T_{measured}$)*adjustment factor. An adjustment factor is applied to the difference between the Humidex setpoint and the measured temperature to create a larger value. In practice, using a larger humidex value will reduce the short-cycling of HVAC system 20, which is harder on the equipment and is generally less efficient heating and cooling. In the current embodiment, a humidex differential of 1.4 is used. Thus, if the actual differential between $T_{measured}$ and the humidex setpoint is 0.5 degrees, the adjusted value will be 0.7 degrees.

At step 124, energy control program 100 determines whether to use FLC 114, Comfort Control strategy 112A or Saving Control strategy 112A to determine whether or not to engage HVAC system 20. FIG. 6C is an illustration of a psychometric chart that illustrates the control logic of energy control program 100. On this chart, the X axis represents the dry bulb temperature ($T_{measured}$) measured by smart thermostat 26 and/or remote sensors 34. They axis represents the absolute moisture content of the air within premise 10 (as measured in grams/cubic meter). The dotted curves represent the relative humidity (RH %) plotted to changes in temperature and moisture content. The sloping lines represent derived humidex temperatures (Hx).

In this embodiment, the user has set the temperature setpoint to 22 C and energy control program 100 is in cooling mode. When energy control program 100 is using Control strategy 112A, then cooling system 24 will be engaged whenever $T_{measured}$ deviates upwards from 22 C (after factoring in the deadband around the setpoint). FLC 114 works the same as Control strategy 112A, but substitutes Hx values for $T_{measured}$ values. Using pure FLC 114 control, cooling system 24 will be engaged when the indoor Hx value exceeds the Hx setpoint plus the Hx differential. Thus, the higher the mRH, the earlier cooling system 24 will be engaged, and the lower the mRH, the later cooling system 24 is engaged. However, when feels like setting 108 is turned on, energy control program 100 uses both savings control strategy 112B and FLC 114. In this case, cooling system 24 is engaged only when both savings control strategy 112B and FLC 114 would turn on the cooling system. This combined logic creates energy savings over pure both savings control strategy 112B and FLC 114. In heating mode, FLC 114 works the same as comfort control strategy 112A, and the savings control strategy 112B works the same (but with the setpoint applied in the opposite direction)

At step 126, energy control program 100 determines the control temperature used by HVAC system 20, which will engage or disengage heating equipment 22 or cooling equipment 24. Part of energy control program 100 is 'normalizing' the $T_{measured}$ values provided by smart thermostat 26 and remote sensors 34, and that are displayed on the touchscreen 64 of smart thermostat 26 and on the remote device 30 when the user is running the energy control program 100 on that device. Normalizing the $T_{measured}$ values means converting RH % and dry bulb temperature readings from smart thermostat 26 and remote sensors 34 into the equivalent temperature-based, feels-like temperatures (nHx). nHx is derived using the same lookup table 118 (FIG. 6B) used at step 120. Again, linear interpolation may be required as well. For example, to calculate the normalized Hx value of a sensor reading with 25 Hx using a mean RH of 60%, an algorithm will need to identify then interpolate between 24.5 (i.e., 21.5 C@60%) and 25.2 (i.e., 22.0 C@60%), resulting in 21.9 C (which may be converted to degrees Fahrenheit as usual).

nHx values were designed as a bridge between Hx temperatures and normal (dry bulb) temperatures to meet consumer expectations for how a thermostat should respond/respect users' existing setpoints. Despite all this happening "under the hood", users only need to know that their smart thermostat 26 is factoring humidity help them save and/or stay comfortable. Energy control program 100 can combine the different control strategies in heating or cooling mode. However, when energy control program 100 is in Auto mode, if feels like setting 108 is enabled, it will operate as if under FLC 114 control, regardless of the other settings.

| Feels Like setting 108 | HVAC Mode | Humidity Scenario | Current Temperature Display Field | Impact |
|---|---|---|---|---|
| Off (use dry bulb temperature only) | ANY | ANY | $T_{measured}$ | n/a |
| Humidity Control only (FLC 114) | ANY | Humid | nHx | cooling comfort, heating savings |
|  | ANY | Dry | nHx | cooling savings, heating comfort |
| FLC 114 and Savings control 112B | Cooling | Humid | nHx (= $T_{measured}$) | n/a |
|  |  | Dry | nHx | Increased saving |
|  | Heating | Humid | nHx | Increased saving |
|  |  | Dry | nHx (= $T_{measured}$) | n/a |
|  | Auto | n/a | When in Auto mode and under Savings control use Humidex control instead. |  |

| Feels Like setting 108 | HVAC Mode | Humidity Scenario | Current Temperature Display Field | Impact |
|---|---|---|---|---|
| FLC 114 and | Cooling | Humid | nHx | Increased comfort |
|  |  | Dry | nHx (= $T_{measured}$) | n/a |
| Comfort Control 112A | Heating | Humid | nHx (= $T_{measured}$) | n/a |
|  |  | Dry | nHx | Increased comfort |

Figure 6D:
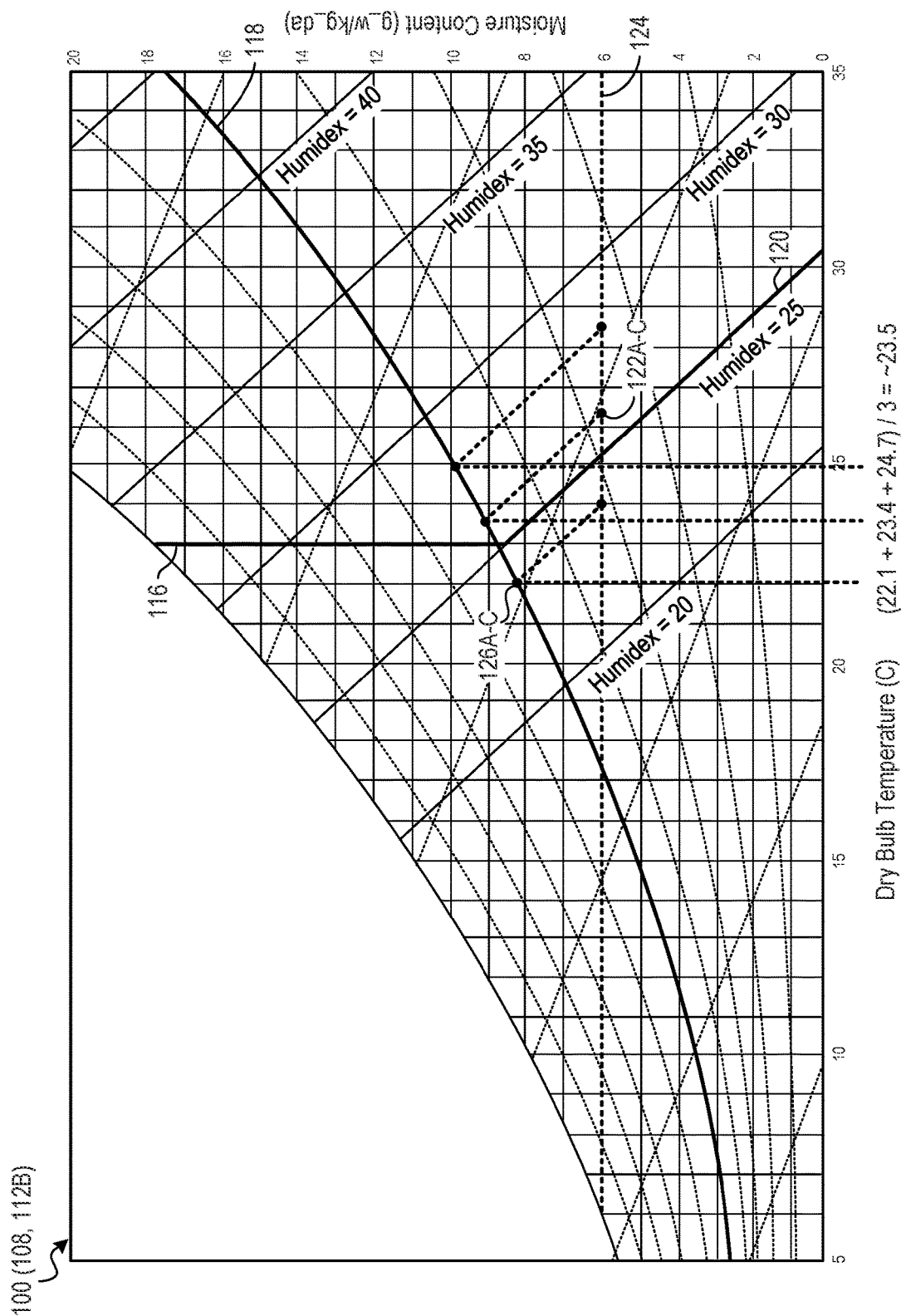
FIGS. 6D-6G show psychometric charts for the feels-like control shown in FIGS. 6A and 6B in different scenarios.

An example of energy control program 100 with feels Like Control 108 and Savings control 112B enabled is shown in FIG. 6D. In this scenario, all the sensor readings from remote sensors 34 are below the mRH. The temperature setpoint is set to 23 C (temperature setpoint plot 116). In this example, the mRH (over the past seven days) has been 50%, shown here as mRH plot 118. The temperature setpoint plot 116 intersects with the mRH plot 118 at a humidex of 25 (savings control plot 120). Presently, smart thermostat 26 has a measured temperature of 26 C, and the two remote sensors 34 have measured temperatures of 24 C and 28 C (shown as measured temperatures 122A, 122B and 122C). The current air humidity coefficient ratio is 6 g/kgda (as measured by smart thermostat 26 and shown as moisture plot 124). All three measured temperatures 122A-122C are plotted along moisture plot 124. Next, each of the measured temperatures 122A-122C are mapped to mRH plot 118 to calculate the normalized T values 126A-126C (22.1 C, 23.4C and 24.7 C). These values 126A-126C are then averaged together to arrive at a nHx value of 23.5 C. Since the nHx value of 23.5 is greater than the temperature setpoint of 23 C, cooling system 24 is engaged. Since all the normalized T values are under the mRH, the results are identical as using normal temperature control.

Figure 6E:
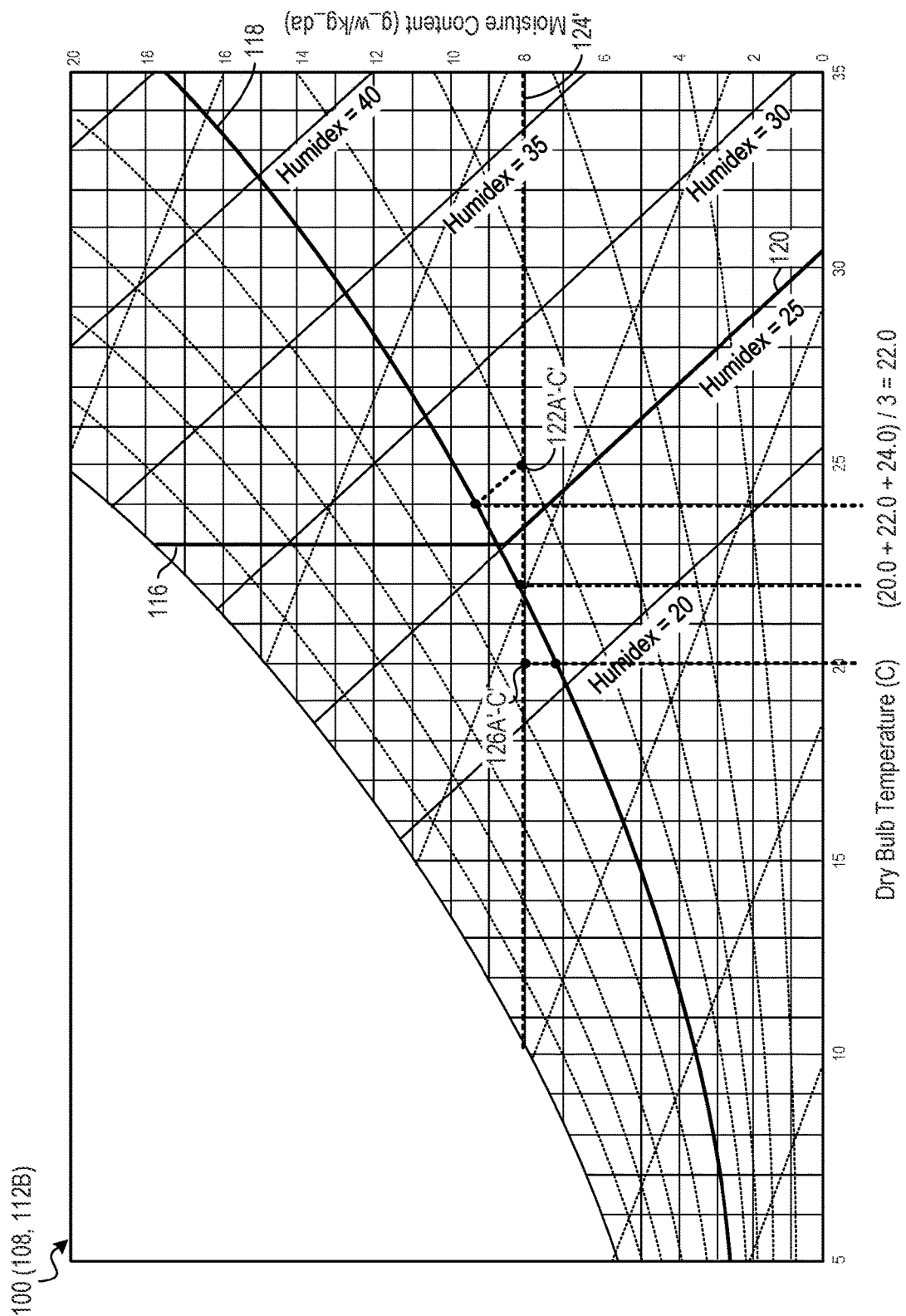

Referring now to FIG. 6E, in this scenario, some of the sensor readings are below the mRH. Again, the temperature setpoint is set to 23 C (temperature setpoint plot 116) and the mRH (over the past seven days) has been 50%, shown here as mRH plot 118. The temperature setpoint plot 116 intersects with the mRH plot 118 at a humidex of 25 (savings control plot 120). Presently, smart thermostat 26 has a measured temperature of 22 C, and the two remote sensors 34 have measured temperatures of 20 C and 25 C (shown as measured temperatures 122A', 122B' and 122C'). The current air humidity coefficient ratio is 8.2 g/kgda (as measured by smart thermostat 26 and shown as moisture plot 124'). All three measured temperatures 122A'-122C' are plotted along moisture plot 124'. Next, each of the measured temperatures 122A'-122C' are mapped to mRH plot 118 to calculate the normalized T values 126A'-126C' (20 C, 22 C and 24 C). These values 126A'-126C' are then averaged together to arrive at a nHx value of 22 C. Since the nHx value of 22 is lower than the temperature setpoint of 23 C, no cooling is required.

Figure 6F:
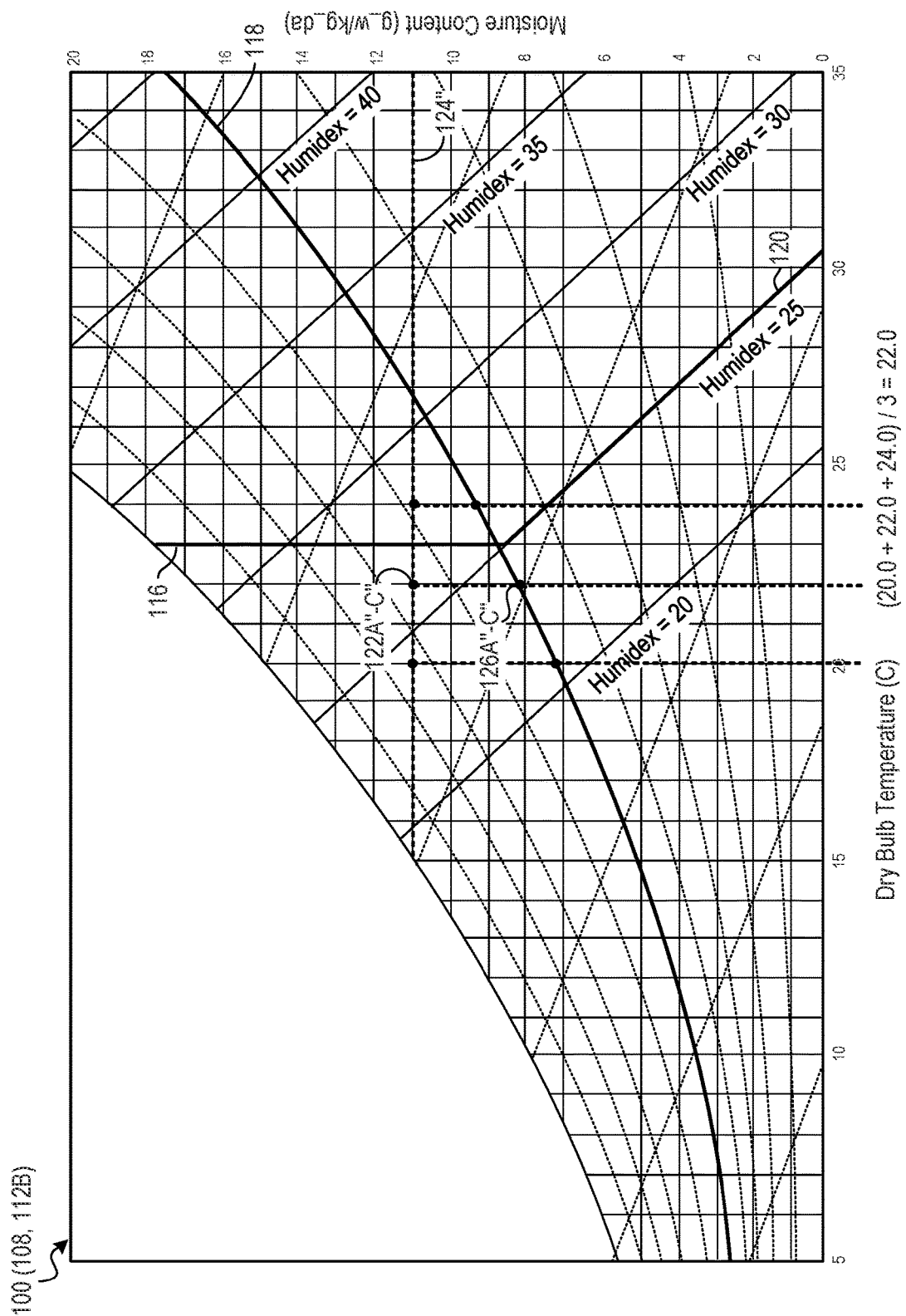

Referring now to FIG. 6F, in this scenario, in this scenario, feels like control 108 and savings control 112B are being used. Here, all of the sensor readings are above the mRH. Again, the temperature setpoint is set to 23 C (temperature setpoint plot 116) and the mRH (over the past seven days) has been 50%, shown here as mRH plot 118. The temperature setpoint plot 116 intersects with the mRH plot 118 at a humidex of 25 (savings control plot 120). Presently, smart thermostat 26 has a measured temperature of 22 C, and the two remote sensors 34 have measured temperatures of 20 C and 24 C (shown as measured temperatures 122A", 122B" and 122C"). The current air humidity coefficient ratio is 11 g/kgda (as measured by smart thermostat 26 and shown as moisture plot 124"). All three measured temperatures 122A"-122C" are plotted along moisture plot 124". Next, each of the measured temperatures 122A"-122C" are mapped to mRH plot 118 to calculate the normalized T values 126A"-126C" (20 C, 22 C and 24 C). These values 126A"-126C" are then averaged together to arrive at a nHx value of 22 C. Since the nHx value of 22 is lower than the temperature setpoint of 23 C, no cooling is required. Since all the normalized T values are above the mRH, the results are identical as using normal temperature control.

Figure 6G:
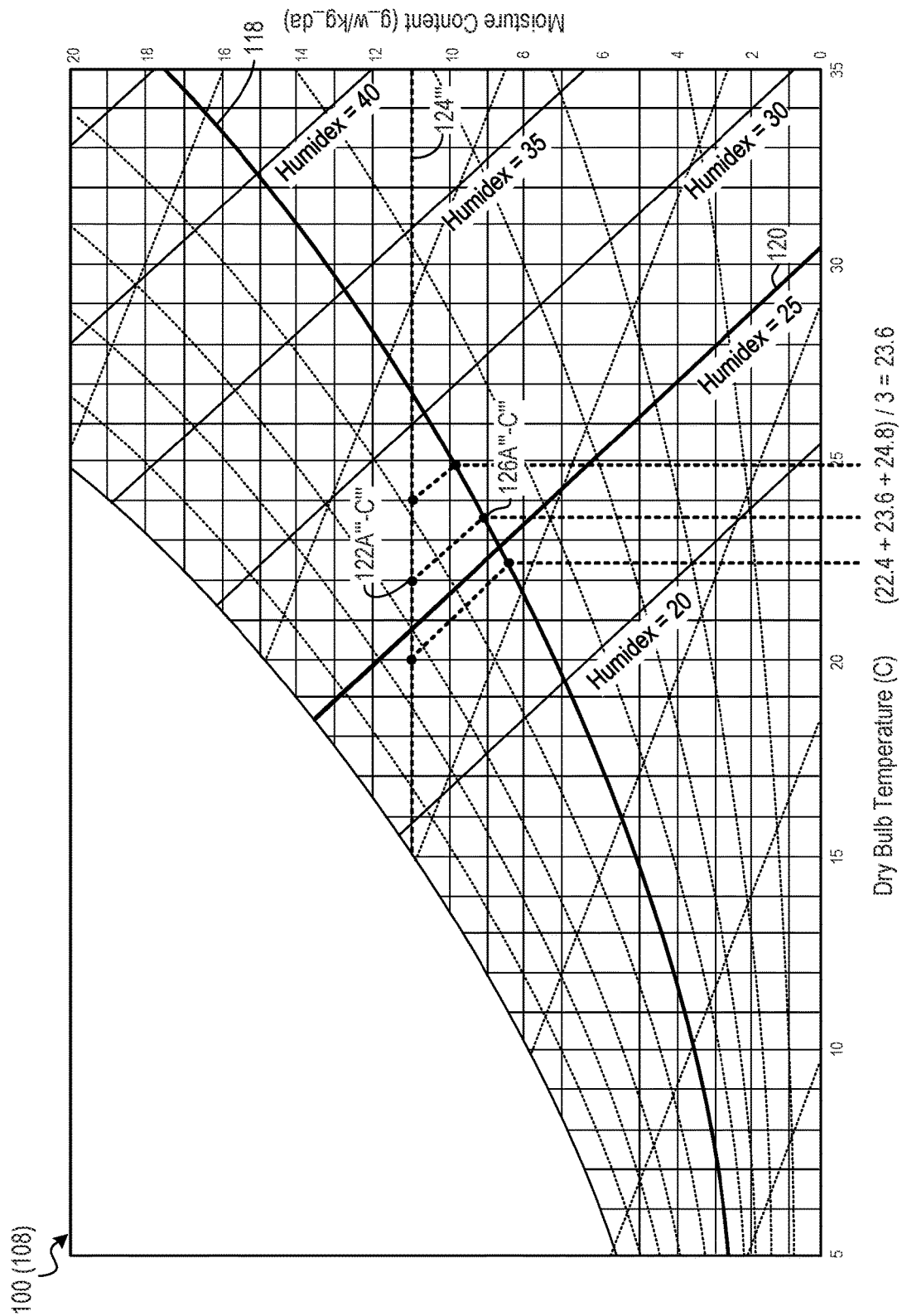

Referring now to FIG. 6G, in this scenario, feels like control 108 and comfort control 112A are being used. Here, all of the sensor readings are above the mRH. Again, the temperature setpoint is set to 23 C (temperature setpoint plot 116) and the mRH (over the past seven days) has been 50%, shown here as mRH plot 118. The temperature setpoint plot 116 intersects with the mRH plot 118 at a humidex of 25 (savings control plot 120). Presently, smart thermostat 26 has a measured temperature of 22 C, and the two remote sensors 34 have measured temperatures of 20 C and 24 C (shown as measured temperatures 122A", 122B" and 122C'''). The current air humidity coefficient ratio is 11 g/kgda (as measured by smart thermostat 26 and shown as moisture plot 124"). All three measured temperatures 122A"-122C" are plotted along moisture plot 124". Next, each of the measured temperatures 122A"-122C" are mapped to mRH plot 118 to calculate the normalized T values 126A'''-126C''' (22.4 C, 23.6 C and 24.8 C). These values 126A'''-126C''' are then averaged together to arrive at a nHx value of 23.5 C. Since the nHx value of 323.5 is higher than the temperature setpoint of 23 C, cooling system 24.

Home Monitoring Service

The combination of smart devices, such as smart thermostat 26, remote sensors 34, smart camera 36, smart doorbell 38, smart light switch 28 and contact sensors 40 provide the sensing capabilities for home monitoring program 200. Referring now to FIG. 7A, home monitoring program 200 is cable of moving through differing arm states 202, having an Armed Away state 202A, an Armed Stay state 202B (also known as "perimeter mode") and a Disarmed security state 202C. Home monitoring service 200 is preferably run locally within premise 10 on one or more hub devices, such as smart thermostat 26 or smart camera 36.

Unlike conventional security systems that rely upon a keypad or security fob to control the security state, home monitoring program 200 automatically changes states between Armed Away state 202A, Armed Stay state 202B or Disarmed state 202C, depending on occupancy settings and other data received from devices within premise 10. As will be described in greater detail below, home monitoring program 200 is able to automatically distinguish between "authorized persons", who are allowed within premise 10 and "unauthorized persons", who are not allowed within premise 10 when it is unoccupied by authorized persons. Authorized persons can include family members of premise 10, as well as other trusted persons (housekeeper, dog walkers, etc.). In some cases, authorized persons will not have access to home monitoring program 200 (i.e., they do not have a copy of the home monitoring program running on their remote device and may not even have a remote device).

In Armed Away state 202A, detection of unauthorized occupancy within premise 10 or the triggering of contact sensors 40 will potentially trigger a security alert. A security alert may comprise a siren, flashing lights, and a push notification sent to the user's remote device 30. Audio alarms can be provided by the speakers in hub devices such as smart thermostat 26 and smart camera 36, as well as dedicated siren devices (not depicted). In some cases, a security alert may automatically be transmitted to an active security service, or emergency 911 service. In Armed Stay state 202B, detection of occupancy within premise 10 will not trigger a security alert, but the triggering of contract sensors 40 will still potentially trigger a security alert. When in Disarmed state 202C, security alerts will not be automatically triggered. Determining which security state that it should be in and determining whether or not to trigger a security alert are both functions of home monitoring program 200 and are described in greater detail below. When no occupancy is detected within premise 10 after a specific period of time, home monitoring program 200 automatically moves from Disarmed state 202C to the Armed Away state 202A—home monitoring program 200 then actively monitors the home for intrusion using the inputs from remote devices 30, remote sensors 34 and contact sensors 40, looking to detect anomalies. When home monitoring program 200 detects the arrival of an authorized person back within premise 10, home monitoring program 200 automatically moves to the Armed Stay state 202B or Disarmed state 202C, depending on user preference.

Referring no to FIG. 7B, home monitoring service 200 uses three primary modules to determine the arm state 202: the presence module 204, intrusion module 206, and the agent module 208. Presence module 204 actively tracks authorized users within premise 10 via occupancy sensing inputs (such as through occupancy inputs from remote sensors 34), geolocation input signals received from remote devices 30, and sound inputs (such as the microphones found on smart thermostat 26 and smart camera 36). The intrusion module 206 takes inputs received from presence module 204 and differentiates between false positives and true positives. False positives include false occupancy sensing (for example, pet motion detected by remote sensors 34), false geolocation signals (for example, an authorized user leaving one of their remote devices 30 within premise 10) and false sound inputs (such as external noise, or noise within premise 10 not related to occupancy). Preferably, intrusion module 204 is also operable to distinguish occupancy signals created by authorized uses and unauthorized persons within premise 10. Agent module 208 takes inputs from intrusion module 206 and presence module 204 and will act as the user interface between authorized persons and home monitoring program 200.

Detecting presence is all about both detecting occupancy and the identification of authorized persons within premise 10. Currently many industry-based solutions rely on geofence from an authorized person's remote device 30, or a security pin pad where the code is used to uniquely identify a user. In contrast to prior art solutions, presence module 204 uses multiple inputs from the array of sensors located within premise 10, including remote sensors 34, contact sensors 40 as well as devices such as smart camera 36 and authorized user's remote device 30 (i.e., their mobile phone) via geofencing or other signal recognition to create a Baysian "belief network" about whether authorized persons are within premise 10, and then probabilistically (and automatically) move between arm states 202. FIG. 7C shows a presence belief network 210, which receives various inputs such as occupancy input 212A, sound input 212B, remote device input 212C, contact sensor input 212D, schedule input 212E and historical input 212F. These inputs are not simple binary values, but rather a probabilistic value indicating the presence module 204's confidence in the predictive value of that input. As such, presence belief network 210 can determine what is the probability that premise 10 is currently being occupied by an authorized user based upon current and past events.

Occupancy input 212A reflects captures all the inputs provide by remote sensors 34 to create an occupancy confidence value (prob_occupancy) between 0 and 1. Remote sensor(s) 34 is typically a PIR sensor that outputs a binary value (with certain thresholds) indicating that the area it is monitoring within premise 10, is occupied or unoccupied. A PIR sensor detects heat changes in that sources include people, animals, air conditioning wind currents, windows (during the day) and incandescent lamps. The nature of PIR brings incomplete occupancy detection by failing in detecting persons who are not moving, failing to detect persons in sensor blind spots and false triggering. Simple notions of occupancy (i.e., the home is occupied/unoccupied) may not be adequate to provide reliable switching between arm states 202. For example, an authorized person might enter a room 12 (or portion of a room 12) that is not currently being sensed by a remote sensor 34, or may stay motionless once in that room 12 (i.e., sleeping, watching television, etc.). Referring now to FIG. 7D, occupancy input 212A is shown in greater detail. In the current embodiment, occupancy input 212A is structured as a three-dimensional array of input values having an occupancy resolution dimension 214A, a temporal resolution dimension 214B and a spatial resolution dimension 214C. The occupancy resolution dimension 214A includes input values for Occupancy (i.e., a zone within premise 10 has at least one detected person within it), Count (the number of detected persons within that zone of premise 10), the Identity of those persons (i.e., an authorized person or an unknown person), and the Activity detected (i.e., what the detected persons are doing). Determination of input values along occupancy resolution dimension 214A can vary. For example, detecting occupancy can be done by a simple PIR sensor on a remote sensor 34, whereas Count may require machine vision software running on smart camera 36 (or the near-simultaneous triggering of remote sensors 34 within premise 10). Activity can also be determined though machine vision and machine learning software running on devices within premise 10. The Temporal resolution dimension 214B tracks these inputs over time. Generally, the input values will decay over time. Furthermore, temporal resolution dimension 214B can track events over specific days of the week, where it may recognize different patterns of input events on weekdays and weekends. The spatial resolution dimension 214C includes spaces (such as rooms 12) within premise 10, as well as potentially the arrangement of these spaces within premise 10 (such as lower floor, upper floor or exterior walls 14B and interior walls 14A).

Sound input 212B helps establish the probability of occupancy and presence (authorized or unauthorized) by analysing the sounds emanating within premise 10. As mentioned previously, various hub devices such as smart thermostat 26 and smart camera 36 include microphones. Sound inputs 212B can use both the volume (intensity) and duration of sounds to determine occupancy. In addition, the hub devices can use audio processing to classify the nature of the sound. For example, the hub device can use audio-pattern recognition to recognize the known voices of authorized users. Hub devices could also recognize specific sounds such doors being unlocked or opened, glass breaking and smoke/CO alarm detection. Optionally, sound input 212 can also determine baby crying or pet distress sounds. Sound inputs 212B from these hub devices can be combined with occupancy inputs 212A to avoid registration of loud sounds that originate outside of premise 10 as a valid occupancy input.

FIG. 7F shows a flowchart for the processing of raw audio by presence module 204, and assigning a sound occupancy confidence value to sound input 212. At step 242, presence module 210 defines an adaptive noise floor (ANF), which can be considered the background noise level within premise 10. The ANF changes over time so that persistent changes in noise (such as construction noise outside, or a television left on) will not fool presence module 204 into believing that an unoccupied premise 10 is occupied. In addition, presence module 10 will filter out white noise-like sounds. At step 244, presence module 210 will calculate the instant sound volume (ISV) and the current signal to noise ratio (SNR) between the ISV and the ANF. and the adaptive noise floor. When some audio event happens that is audibly loud, the SNR will be at some value that observably larger than 1, suggesting that there is occupancy within premise 10. If the ISV is roughly equivalent with the ANF, the SNR will be at or close to 1, which means it's highly likely that there is no occupancy within premise 10. As step 246, presence module 204 maps the SNR to create a sound occupancy confidence value a probability between 0 (no occupancy) and 1 (occupancy). At step 248, the sound occupancy confidence value is smoothed over time. Shorter sounds reduce the sound occupancy confidence value, whereas longer sounds are more suggestive of occupancy. By this approach, transient sounds, if occurs as a single event without any contextual sound content, will be filtered out from occupancy consideration (reducing the sound occupancy confidence value to near zero). If a series of sound events happens closely, the cumulation introduced by smoothing will make it more likely that the sound is considered occupancy-related (sound occupancy confidence value approaches 1), even when the sound is not very loud. In cases where the ISV exceeds a certain threshold, the presence module 204 will set the sound occupancy confidence value to one, regardless of the duration of that ISV. At step 248, intrusion module 206 determines a sound intrusion value between 0 and 1. Intrusion confidence values of sounds can be determined based upon sound pattern-matching analyses or machine learning-based analyses by home monitoring program 200.

Remote device input 212C creates a remote device confidence value (between 0 and 1) based upon one or more signals emanating from the authorized user's remote device 3. Signals used to calculate the remote device confidence value may include a geo-fencing signal 216, Bluetooth beacon signal 218, and a network connectivity signal 220. Geofencing signal 216 relies upon remote devices 30 being located within premise 10 and transmitting its location to home monitoring program 200, either automatically or in response to a query from home monitoring program 200. Bluetooth beacon signal 218 uses the capabilities of the Bluetooth networking protocol to determine occupancy. A hub device (such as smart thermostat 26) would broadcast a beacon message, with an identifier number. When a remote device 30 (such as a smart phone or smart watch) of an authorized user comes within range of the beacon, it will receive that message and know its proximity to the beacon. The remote device 30 can then transmit its proximity back to the hub device. Presence module 204 can then assign an occupancy probability for remote device confidence value based upon that proximity. Network connectivity signal 220 indicates the current presence of the remote device 30 located on the LAN of network 28. Home monitoring program 200 collects the MAC address of each remote device 10 on the shared LAN, and thus may determine at any time whether that remote device 10 is currently on the same network (by pinging those remote devices 10).

The presence belief network 210 may apply different weights to the different signals of remote device input 212C or may simply take the strongest signal value. Some remote devices 30 may not use a geofencing signal 216 or a Bluetooth beacon signal 218. In some cases, a particular remote device signal may vary widely, suggesting poor device connectivity, suggesting that that device signal should not be can fluctuate widely, suggesting poor device connectivity. In other cases, the device signal varies very little over time, suggesting that the device never leaves premise 10. In both of these scenarios, presence module 204 will assign low remote confidence values to those devices.

Contact sensor input 212D (which registered the current state of contact sensors 40) can modify the confidence values of the other inputs. Within home monitoring program 200, the sequence of occupancy inputs from remote sensors 34 and contact sensor 40 inputs impacts the arm state 202. For example, the triggering of an occupancy input from a remote sensor 34 followed by a contact sensor 40 input indicates the likelihood that someone has approached, opened and closed the door to leave premise 10. Whereas when the sequence is reversed (i.e., contact sensor 40 indicates an open/close input followed by an occupancy input from that same remote sensor 34), indicates that a person has entered premise 10. Over time, machine learning within home monitoring program 200 will automatically detect these patterns and move to the appropriate arm state 202 without intervention from an authorized person.

Schedule input 212E can also modify the confidence values of the other inputs. Schedule input 212E can modify the confidence values of the other inputs based upon the programming schedule 130 of the energy control program 100. For example, when energy control program 100 is currently in sleep period 132C, then home monitoring program 200 may automatically move into Armed Stay state 202B. In addition, the sensitivity of sound inputs 212B could be increased, reflecting the fact that premise 10 is quieter than during the Home period 132A.

Historical input 212F (FIG. 7E) can also modify the confidence values of the other inputs, based upon the machine learning capabilities of home monitoring program 200. Over time, presence module will create a positive predictive value (PPV) 222, and a negative predictive value (NPV) 224. PPV 222 represents the probability of the inputs 212 correctly identifying a true occupancy event and NPV 224 represents the probability of the inputs 212 correctly identifying a true unoccupied event. Over time, presence module 204 is operable to establish predictive measures of sensitivity 226 (the probability of true positive events over true positive and false negative events), specificity 228 (the probability of true negative events over false positive and true negative events) and overall accuracy 230 (the combined probability of true positive and true negative events over all events).

Presence module 204 will sum together (or otherwise calculate) the presence belief network 210 based upon all the inputs 212 and transmit the value to intrusion module 206. While presence module 204 determines whether one or more authorized users are in premise 10, intrusion module 206 is responsible for detecting threats and determining whether an occupancy event is caused by an unauthorized intruder. When an occupancy alert or an open contact alert is detected while home monitoring program is in the Armed Away or Armed Stay, intrusion module 206 determines whether the occupancy event is created by an authorized user or an unauthorized user. When an intrusion is detected, an alert is sent to the home monitoring remote application 240 on the user's remote device 30, and depending on the nature of the alert, a siren sound may be automatically generated. In some embodiments, an alert message may be sent to a professional monitoring or emergency 911 service.

Agent module 208 determines the state of home monitoring program 200, between an "Armed Away" state 202A and a "Disarmed" state 202C. Agent module 208 also provides an interface in home monitoring program 200 to allow an authorized person to manually set, or otherwise override the automated state. Agent module 208 may include other states such as a "health emergency" state, a "fall detection state", "pet distress state", etc. Another potential state would be "Package delivery" state, which would provide a set of actions including a time-limited unlocking of a smart lock, disabling an occupancy alert nearest to the opening of a door contact sensor 40, but keeping the rest of premise 10 within the Armed Away state. Another potential state would be a "door chime state". In the door chime state, when home monitoring program 200 detects a door chime (whether from a smart doorbell 38 or from a conventional doorbell), it temporarily disarms alerts created by one or more contact sensors 40 when occupancy is first detected by said contact sensor 34. Thus, a person inside premise 10 could walk up and answer the door without receiving a notification of an alert.

Agent module 208 is also responsible for transmitting notifications to the user on their remote device 30. FIG. 8A shows an alert notification 238A of a change of armed state being transmitted to remote device 30. Examples of alert notification 238A could include: "Monitoring automatically set to Arm Away by <First name>", "Monitoring automatically set to Disarm by <First name>", "Monitoring set to Arm Away by <First name>", "Monitoring set to Arm Stay by <First name>" or "Monitoring set to Disarm by <First name>".

Figure 8B:
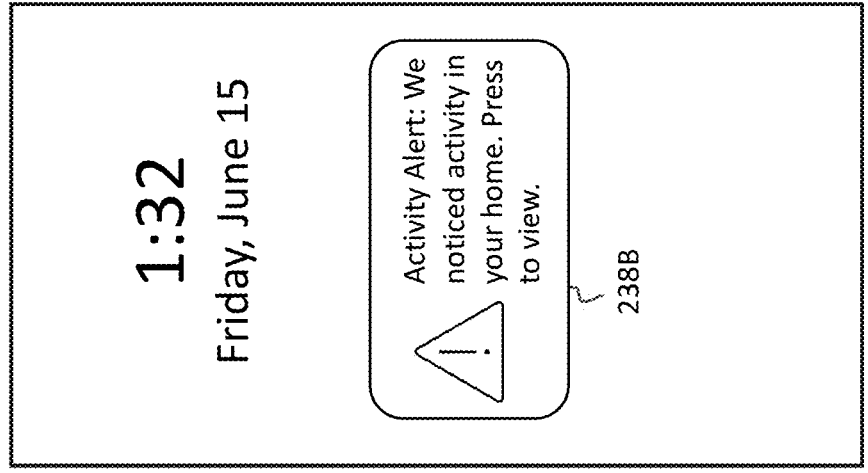
FIGS. 8A-8B show notifications for the home monitoring program being displayed on the remote device shown in FIG. 1.
Figure 8A:
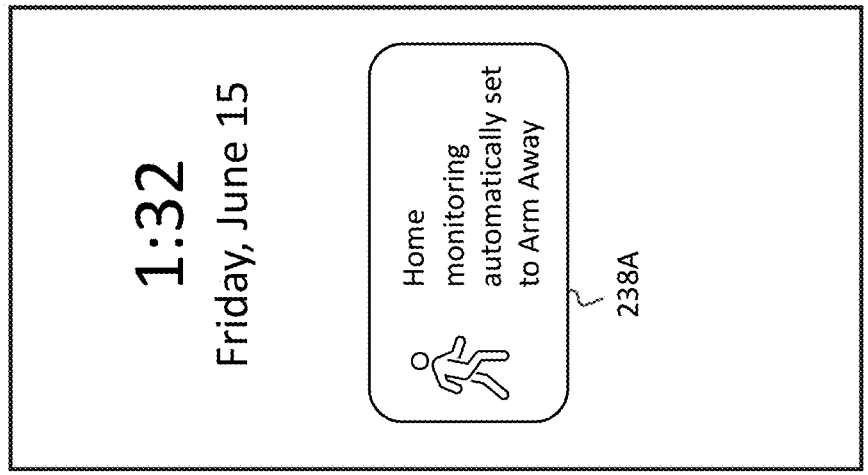

FIG. 8B shows an alert notification 238B of a change of an unknown activity being transmitted to remote device 30 from a home monitoring program 200 that is in the Armed Away state 202A. By pressing on the alert notification 238B, the remote device 30 opens up the remote home monitoring application 240 (FIG. 8C). Home monitoring remote program 240 provides remote control over home monitoring program 200 and can show additional details such as a live camera feed from smart camera 36, the ability to view recorded camera clips (clips being stored on remote servers 32). The home monitoring remote application 240 may also include other features such as manually triggering a siren 166, providing remote conversation to premise 10 (via hub-based microphones and speakers). The home monitoring remote application 240 also includes the ability for the user to dismiss an alert or dismiss and disarm home monitoring program 200 (FIG. 8D). Using machine learning, home monitoring program 200 will be able to reduce false positives based upon manual inputs provided through home monitoring remote application 240. FIG. 8E shows a summary screen on home monitoring remote application 240 listing all events and alerts registered by home monitoring program 200.

In addition to the automated functions of home monitoring program 200, authorized users can change the armed state of home monitoring program 200 manually. As discussed before, users can set the armed state via home monitoring remote application 240 on their remote device 30. Preferably, users can also set the armed state using the interface on another hub device that they own, such as smart thermostat 26. Control can be provided by touchscreen or other physical interface, or via a voice command heard by the microphone on the hub device Additionally, agent module 208 can include additional responses to alerts (whether automated or manual). For example, in addition to an automated or manual siren, agent module 208 could turn on all smart light switches 28 within the home. In cases where a fire alarm is detected by intrusion module 206, agent module 208 could issue a command to smart thermostat 26 to turn off any attached HVAC equipment. If a contact sensor 40 is left open for a prolonged period of time, agent module 208 could issue a command to smart thermostat 26 to disable any HVAC equipment to minimize energy waste while it notifies the authorized users via home monitoring remote application 240.

The following scenarios describes how home monitoring program 200 will work for the typical family of authorized users. Premise 10 has two people living in it, Max and her partner Phil. They both have home monitoring remote application 240 installed on their smart phones (remote devices 30). Geofencing is enabled on their remote devices 30. Their premise 10 is equipped with one smart thermostat 26 (installed in the main hallway, within distance of the front-door), one smart lightswitch 16 (installed in the bedroom upstairs), two remote sensors 34 and two contact sensors 40 (installed at front-door and upstairs window).

Example 1: Leaving premise 10. Max and Phil leave premise 10 for work in the morning. As they both exit premise 10, presence module 204 receives multiple inputs that are at or approaching a value of zero (occupancy input 212A indicates no current occupancy, sound input 2126 indicates that the ISV is close to the SNF), remote device input 212C registers a declining geofence signal 216, etc.), and forms a presence belief network 210 indicating that premise 10 is unoccupied. Agent module 208 moves home monitoring program 200 into the Armed Away state 202A.

Example 2: Coming home and it recognizes me. Later that evening, Max returns home to premise 10. Because she has her phone (remote device 30) with her, home monitoring remote application 240 will signal to home monitoring program 200 that she's returned home via geofence signal 216. Since home monitoring program 200 knows Max is within 10 m of premise 10, when the door is open (via the open state of door contact 40), the presence belief network 210 assumes that Max is entering premise 10 so Arm state 202 moves from Armed Away state 202A to Disarmed State 202C. At the same time, agent module 208 transmits a notification to Phil on his remote device 30 that his partner Max has come home to premise 10. Later when Phil returns home to premise 10, home monitoring program 200 goes through the same logic and recognizes Phil as an authorized user within premise 10. In addition, home monitoring program 200 can detect when Max or Phil's phone (remote device 30) joins the home Wi-fi network by noticing that the MAC address of their remote deice 30 rejoins the LAN or via Bluetooth beacon on the remote thermostat 26. Depending on its location within premise 10, smart camera 36 may also be able to do facial recognition to identify each person. There is no explicit user-action needed to Arm or Disarm the system to explicitly change arm states 202. Users just go about their day and home monitoring program 200 works automatically. Since both authorized users are now home, there is no need to transmit an unnecessary notification message on users' remote devices 30.

Example 3: Someone unknown opens a door. Max and her partner Phil have both left premise 10 in the morning for work. Home monitoring program 200 has detected everyone has left premise 10 (as described above) and is now in an Armed Away state 202A. Later, during the afternoon, home monitoring program 200 notices a possible intruder detected open event—the contact sensor 40 by the door has opened, but presence module 204 cannot identify an authorized user (for example, a lack of a recognized geofence signal 215 or Bluetooth beacon signal 218). Home monitoring program 200 plays generates an audio message "This is home monitoring program 200 please identify yourself!" on a user-configured, speaker-enabled device (typically one or all of the hub devices) in premise 10 as well as all the associated remote devices 30. If this was a real intruder, this sound would possibly scare off the intruder. If this was Max, who had just lost her phone (remote device 30) that day, she would need some way of moving home monitoring program 200 to the Disarmed state 202C. In this scenario, she identifies herself out loud (creating a sound input 212B value at or close to one), prompting home monitoring program 200 to disarm itself (moving to Disarmed state 202C) using the voice recognition provided by the nearby smart thermostat 26. That lets home monitoring program 200 identify Max and ignore the door opening. Alternatively, if presence module 204 could not recognize Max as an authorized user by voice recognition, Max could also identify herself via speaking a passcode, saying "home monitoring program 200, it's me. One Two Three Four".

At the same time, home monitoring program 200 also tried to notify all the authorized users. It does so via a push notification to Max's and Phil's phones (remote devices 30) with messaging about the suspicious event. Home monitoring remote application 240 would also collect all relevant information (other events in a timeline) and display that info in an easy to review format (e.g., FIG. 9E). After reviewing what happened, Phil would decide whether this was a real intrusion or not. If this was a real intruder, Phil could then trigger the siren manually, call the police, or just ignore it. If Phil does not respond via his home monitoring remote application 240, then home monitoring program 200 would automatically activate the siren after a (configurable) period of time.

In some scenarios, to improve on push notifications, home monitoring program 200 can call another authorized person a phone call (on their remote device 30). If an authorized user picks up, then an automated system explains the situation at home via a text-to-speech message. Furthermore, it is contemplated that home monitoring program 200 could connect to a professional monitoring service where the agents will call the homeowner directly and verify if there is an issue at their home. Other options for home monitoring program 200 include providing more ways to confirm what's happening by adding live and pre-recorded video feeds, live and pre-recorded sound clips and even a drop-in two-way voice.

Example 4: During the day, when there's someone at home. Max has left premise 10 for work in the morning, but Phil is home sick. Home monitoring program 200 has detected that only Max has left premise 10 but knows that Phil remains within premise 10. Since not everyone has left home, home monitoring program 200 is in now in Armed Stay state 202B. In Armed Stay state 202B, it will ignore the remote sensors 34 inside the house because it knows Phil is still at home. Later, during the afternoon, home monitoring program 200 notices a possible intruder-detected open event via contact sensor 40—the door has opened. Home monitoring program 200 needs to differentiate between whether it was just Phil intending to open the door (perhaps checking for mail), or if it was an intruder. Home monitoring program 200 relies on motion sensors 34 and contact sensor 40 as well as historical input 212F. If home monitoring program 200 notices that there is motion within premise 10 before the contact sensor 40 in front of the door is opened, it knows it's probably just Phil getting ready to open the door and that it's not a harmful event of a potential intruder. If the door did open without any remote sensor 34 activating, home monitoring program 200 respond as previously stated and assume it is an unknown person. If contact sensor 40 is not reliably placed to capture the door motion sensing working properly, home monitoring program 200 can fall back to having other ways for Phil to identify to home monitoring program 200 that the door is about to open. Phil may say something like "I'm leaving now" or even press some "I'm leaving" button on the home monitoring remote application 240 or the user interface of smart thermostat 26.

Example 5: At night, when everyone is asleep. It's 2:00 AM and both Max and Phil are asleep. Home monitoring service 200 has automatically entered the Armed Stay state 202B either by detecting a lack of activity on the remote sensors 34 (occupancy inputs 212A), or by being controlled by the programming schedule 130 on smart thermostat 26 (schedule input 212F).

Example 6: Something inside the house detected. Max and Phil have both left premise 10 in the morning for work. Home monitoring program 200 has detected everyone has left premise 10 (as described above) and is now in Armed Away state 202A. During the afternoon, a motion inside premise 10 is detected via remote sensors 34 (occupancy input 212F). Because everyone is away, the intrusion module 206 of home monitoring program 200 feels this is a potentially adverse event. It will combine multiple types of sensors data too, such as occupancy input 212A, sound input 2126 ad remote device input 212C to determine the probability as to whether there is an actual intruder or whether this is a false positive. In this mode, it will no longer trigger on a single motion detector which is known to be unreliable and prone to false positives.

Example 7: The Internet goes out! Max and her partner Phil have both left premise 10 and their home goes into Armed Away state 202A. Later in the day, premise 10 loses access to the Internet (network 28) due to a failure of their home router. Home monitoring program 200 on remote server 32 sends a notification to the homeowners (via their remote devices 30) telling them that the system has lost access to the Internet. When premise 10 regains access to the Internet, home monitoring program 200 will result in home monitoring program 200 moving to offline mode. In which case, without Internet connectivity, home monitoring program 200 should still continue to monitor premise 10, but it will not have access to the more advance detection skills (machine learning models).

If, during the Internet failure, a door opens (as noted by contact sensors 40), home monitoring program 200 running on the hub devices (such as smart thermostat 26) still try to deter any possible intruder. Home monitoring program 200 will play aloud, "This is home monitoring program 200, please enter your 4-digit pin code!" Without Internet connectivity, home monitoring program 200 won't be able to identify users via geofence signal 216, so it needs to fall back to being a "regular security system". If Max doesn't aurally enter their 4-digit code at the smart thermostat 26 in time, a siren will engage.

Example 8: Housekeeper visits and needs temporary access. It's Tuesday afternoon and Max and Phil are both at work. Home monitoring program 200 is in Armed Away state 202A. Their housekeeper, Cory comes in every other Tuesday sometime during the afternoon to clean premise 10. Cory is not very tech-savvy and has not downloaded the home monitoring remote application 240 or otherwise become part of the premise 10's authorized network. Cory would rather not have to go through the whole process of creating an authorized user account and using a real email address. Cory has the keys and opens the door. Max had previously provided Cory with a PIN, so when home monitoring program 200 aurally asks Cory "This is home monitoring program 200 please identify yourself!", Cory simply responds via voice with the PIN and the home is put in to Disarmed state 202C. Alternatively, to identify himself, Cory needs to enter a 4-digit pin into the user interface of smart thermostat 26 (using touch screen 64). Max was able to create a temporary PIN easily for Cory and text the PIN to him. The temporary PIN expires in 24 hours or has a configurable schedule (i.e., it is valid every Tuesday).

Example 9: Window versus Door. Max and her partner Phil have both left premise 10 in the morning for work. Home monitoring program 200 has detected everyone has left home (as described above) and is now in an Armed Away state 202A. When Max first installed the contact sensor 40 at the upstairs window, she specified it was for a window and not a door. This is important because home monitoring program 200 will treat these sensors differently. When a door sensor 40 is opened and home monitoring program 200 can't identify the person, home monitoring program 200 will audibly say "This is home monitoring program 200, please identify yourself". When a window contact sensor 40 is opened, it skips that because intrusion module 206 is not expected anyone from trying to enter through the window. Home monitoring program 200 will play the siren immediately and at the same time notify Max and Phil on their phones (remote devices 30) about a potentially intruder open event.

Example 10: A window is left open when they leave. Max and her partner Phil have both left premise 10 in the morning for work. But Max forgot to close the upstairs window, which has a contact sensor 40. Home monitoring program 200 detected everyone has left home via geofencing signal 216 and that a window was left open (via contact sensor 40). But it still tries it best to keep the home safe, so it enters an Armed Away state 202A. However, because home monitoring program 200 knows the window is open, it doesn't alert on it immediately. Instead, home monitoring program 200 sends a friendly reminder to Max and Phil's phones (remote device 30), "Hey it's home monitoring program 200, sorry but you left your upstairs window open. Don't worry, I'm still watching the home."

Alternatively, the home monitoring program 200 can try to remind people to close the window before they leave premise 10 via a hub device speaker, "Are you leaving for the day? You left the window open."

Example 11: Smoke Alarm Detected. Smoke alarm detection (sound input 212B) is always on—home monitoring program 200 will always notify the authorized users if the smoke or CO2 alarm goes off. In this case, home monitoring program 200 immediately sends notification to remote devices 30. Max/Phil have different options on the device (call 911, fire department or Turn off alert). Optionally, home monitoring program may perform additional actions such as turning on smart light switches 16, turn off HVAC system 20, unlocking smart door locks (if available), maximizing the output on the hub device sirens and providing instructions, "A fire has been detected, please leave the house in an orderly manner".

Example 12: Power Outage. Similar to Internet out; home monitoring program 200 (running on remote servers 32) immediately sends notification to remote devices 30 calls out to the Max/Phil so they know of the situation.

Example 13: Smash and Grab. Smash and Grab refers to the incident whereby an intruder enters premise 10 and immediately smashes the security alarm system so that it doesn't emit a siren alert. Intruder enters premise 10 through door or window. If through the door, the hub devices (such as smart thermostat 26 and smart light switch 16) ask the intruder to identify itself within one (configurable) minute. The intruder sees the smart thermostat 26 and decides to pull it off the wall. At this time, if there are other speaker devices in the home like smart light switch 16, they immediately trigger a siren as intrusion module 206 recognizes that one of the hub devices lost connectivity right after a door open event (on contact sensor 40). Also, the home monitoring program 200 sends a notification to the authorized users that a door was opened but the smart thermostat 26 lost connectivity. Details of events are available to the user through the timeline in home monitoring remote application 240 (FIG. 19E).

Autopilot

Figure 9:
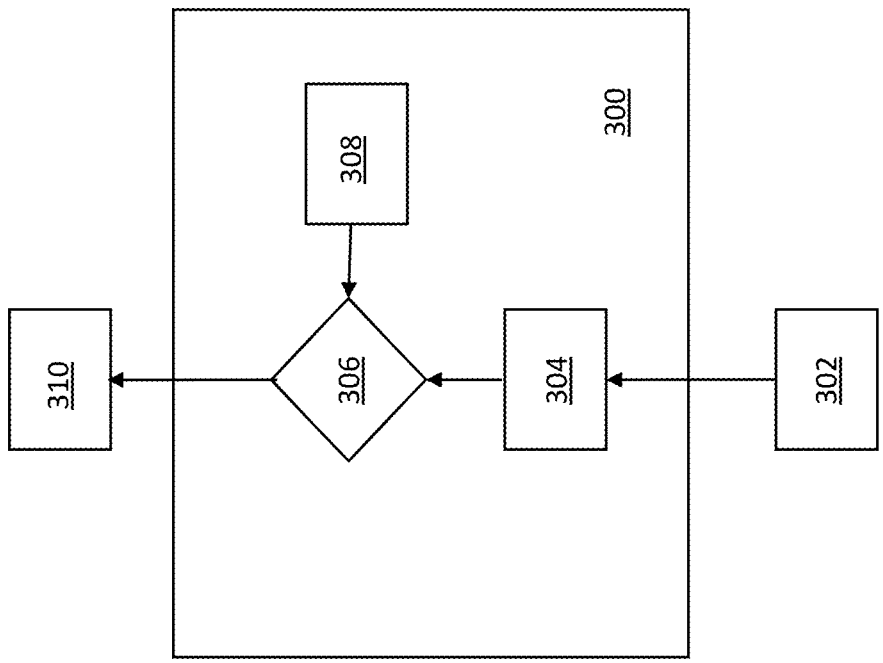
FIG. 9 shows a flow chart of a reflex-based autopilot program adapted to control the devices of premise 10 shown in FIG. 1.

The concept of smart or connected home immediately brings to mind various IoT devices and appliances that are connected to the internet. The goal of these devices is to provide the dwellers a new way to control the home equipment and appliances, in such areas as home monitoring (i.e., home security), lighting and heating and cooling. Ideally, people's appreciation of the smart home is due to experiences that gives people better control of their lives rather than better control of devices. A smart home should enhance the life and daily activities of occupants. This is only possible if smart home makes automatic, optimal decisions so that the user need not to worry about the tasks or device configurations. Within the prior art, users need to come up and program various automation rules and tasks in the devices. Voice assistants have created more seamless interaction with the smart home devices, but they still require the user to respond and command various actions. For example, FIG. 9 shows schematic representation of a simple reflex agent program 300 that controls HVAC and home monitoring functions. Within simple reflex agent program 300, a plurality of environmental inputs 302 (such as provided by thermostat 26, remote sensors 34 and contact sensors 40) provide a set of environmental state data 304 to the reflex agent program 300. Reflex agent program 300 runs a comparison 306 between the environmental state data 304 with state rules provided in in a state rule condition table 308. If at least one datum point in environmental state data 304 matches a rule within state rule condition table 308 issues an actuator command 310 to a device within premise 10 (such as the thermostat 26). Examples could include:

| State rule condition table 308 | Actuator command 310 |
| --- | --- |
| $T_{measured}$ > Tsetpoint + δ | Turn on cooling system 24 |
| $T_{measured}$ < Tsetpoint − δ | Turn on heating system 22 |
| Remote sensor 34 motion = 1 AND Arm state 202 = Disarmed state 202C | Do Nothing |
| Remote sensor 34 motion = 1 AND Arm state 202 = Armed Away state 202A | Have home monitoring program 200 sound an alarm |
| Remote sensor 34 motion = 0 for 2 hours | Turn off HVAC system 20 |

Reflex agent program 300 has certain limitations. The rules need to be predefined, which can increase in complexity dramatically with many different types of environmental inputs 302. Furthermore, the environmental inputs 302 need to send unambiguous signal to reflex agent program 300 so that comparison 306 can match an exact condition within state rule condition table 308. For example, the motion sensor in the example above needs to report motion/no motion with certainty. If sensor creates a false trigger due to an environmental condition, the agent has no ability to adapt and will send a false alarm.

Figure 10:
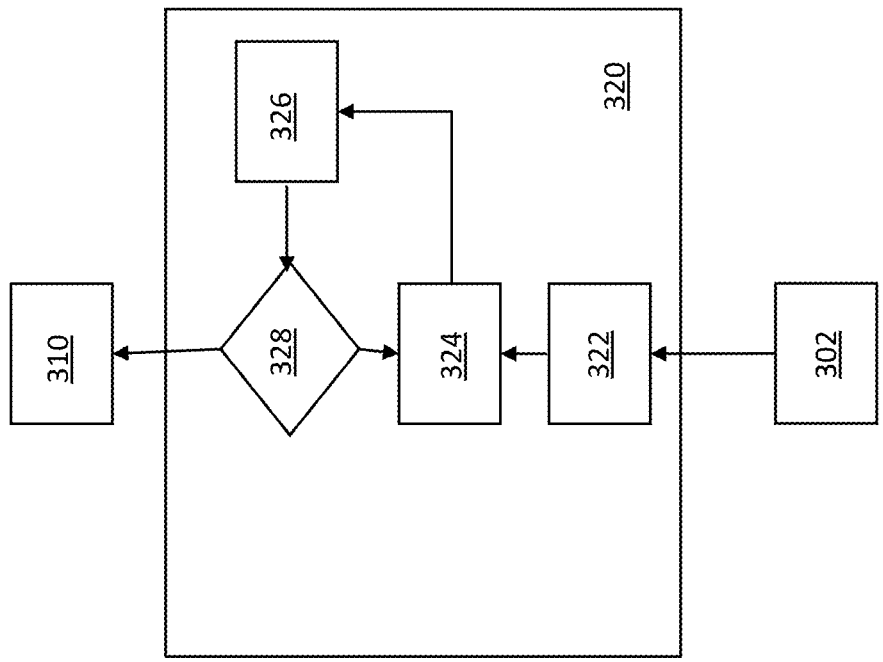
FIG. 10 shows a flow chart of a prediction-based autopilot program adapted to control the devices of premise 10 shown in FIG. 1.

Referring now to FIG. 10, a model-based, predictive autopilot program is shown generally at 320. Predictive autopilot program 320 receives plurality of environmental inputs 302 (such as provided by thermostat 26, remote sensors 34 and contact sensors 40). Predictive autopilot program 320 then infers a set of state estimation values 322. Rather than taking the face value of sensor readings or using raw sensor data from environmental inputs 302, predictive autopilot program 320 infers the current state of the environment of premise 10 by first passing the raw values through a sensing interface (described in greater detail below) and then a predictive module (also described in greater below), which may inference models, machine learning or noise reduction algorithms (such as is described above) to create the state estimation values 322. State estimations can include binary values, probabilistic values (between 0 and 1), smoothed, averaged or adapted measurement values, as is suitable for the environmental input being inferred.

Predictive autopilot program 320 then passes the state estimation values 322 to planner module 324. Planner module 324 provides a proposed action (such as Turn on heating system 22 or sound an alarm). The proposed action may originate from set of heuristic rules similar to state rule condition table 308 of the reflex agent program 300.

Predictive autopilot program 320 then passes the proposed action from planner module 324 to modelling module 326. Modelling module 326 predicts the impact of the proposed action on the future state of the environment within premise 10 over future periods of time to create a predicted value. For example, a prosed action of turn on heating system 22 could estimate the future measured temperature ($T_{measured\_future}$) and required HVAC runtime within premise 10 (predicted values) until the next scheduled setpoint using historical runtime data, or other climate modelling approaches.

Predictive autopilot program 320 then passes the predicted values to optimizer module 328. Optimizer module 328 includes a goal function that needs to be minimized or maximized. The goal function is typically a numeric value representing a desired outcome, such as minimized HVAC runtime or minimized cost for HVAC runtime (which can vary where time-of-use rates apply) or maximized user comfort (treated as the minimum variation from the temperature setpoint within premise 10). The goal function is usually a summation over the current and future states of the environment. Predictive autopilot program 320 uses an iterative process of proposing actions using planner module 324, modelling the proposed action over current and future time frames using modelling module 326 to state and calculate the cost function. It modifies the planned actions until the most minimal (or maximal) value of the goal function is obtained. Optimizer module 328 then issues an actuator command 310 to a device within premise 10 (such as the thermostat 26).

FIG. 11 shows an example of minimizing electricity cost by optimizing HVAC runtime of cooling system 24 using a smart thermostat 26. In this simplified example, predictive autopilot program 320 needs to find a course of actions for cooling in order to minimize total electricity cost over the entire period. Predictive autopilot program 320 includes a modelling module 326 that can predict future indoor temperatures (using a thermal model) as a function of HVAC runtime (where cooling system 24 is either on or off for a period of time) and outside temperature (provided by remote server 32). Planner module 324 proposes different series of engaging cooling system 24 in five-minute intervals. Optimizer module 328 finds the best runtime scenario that minimizes total cost of electricity given by summing over runtime x instantaneous electricity cost. Predictive autopilot program 320 can simply add other factors to its goal objective. For example, it may constrain the goal function by incorporating the maximum allowable deviation from the setpoint temperature. In the current embodiment, the maximum allowable deviation is a user-configured setting of energy control program 100, namely savings adjuster 102. The goal function (cost) may further be lowered if there is a larger chance that premise 10 will remain empty (as provided by occupancy model 210). Predictive autopilot program 320 may also modify the goal objective by factoring in goal function for greenhouse gas content of the electricity as well as its price in the goal function (cost).

The functions and capabilities of predictive autopilot program 320 will vary based upon the types of environmental inputs, sensing interfaces, predictive states, planners, modellers and actuators are provided for the agent. Predictive autopilot program 320 can control HVAC system 20, room lights 16, and can send notifications to users on their remote devices 30. Predictive autopilot program 320 is always connected to remote server 32 across network 28. The modelling module 326 and optimizer module 328 functions of predicative agent 320 may be performed as "edge computing" on the local hub device (such as smart thermostat 26) or as "cloud computing" on remote server 32, or a combination of the two, depending on the computational resources available.

FIG. 12 shows components of predictive autopilot program 320 in five schematic layers. These layers consist of sensors, various sensing inference modules, predictive models, decision making/optimization algorithms and eventually actuators. For example, environmental inputs 302 can include presence data 330 (i.e., geofence, Bluetooth and network activity) provided by remote devices 30, sound data 332 provided by the microphones on devices like the smart thermostat 26 or smart camera 36, temperature data 334 provided by smart thermostat 26 and remote sensors 34 (typically dry-bulb temperature measurements), ambient light data 336 provided by smart light switch 18 and other devices with ambient light sensors), motion sensor data 338 provided by smart camera 36, smart thermostat 26, smart light switch 18 and remote sensors 34, image data 340 provided by smart camera 36, humidity data 342 provided by smart thermostat 26 and remote sensors 34, and contact sensor data 344 provided by contact sensors 40.

As discussed previously, the environmental inputs 302 are converted into state estimation values 322. State estimation values 322 are created by passing the raw data through a sensing interface 346. The raw sensor readings are not always optimal for predictive autopilot program 320. For example, how to find the indoor air temperature in premise 10. Each thermistor sensor (located in smart thermostat 26 or remote sensors 34) that is located in different part of premise 10 may reports a different temperature due to the local environment. Some may report a biased value, e.g., due to proximity to an exterior window or air vent. Some thermistors inside powered devices are exposed to internal heat and their reading needs to be compensated. Sensing interface 346 may include phone presence interface 348, acoustic event interface 350, infrasound event interface 352, temperature sensor interface 354, occupancy sensor interface 356, and human presence interface 358.

Phone presence interface 348 infers and modifies the presence data 330 provided by the remote device 30 based upon previous false positive and false negative events as described above (for example, all authorized persons are outside of premise 10, but one has left their smart phone behind). Acoustic event interface 350 analyses the sound data 332 to determine if humans are present within premise 10, or if recognizes specific sounds such as fire alarms, glass breaking, or babies crying. Infrasound event interface 352 analyses vibration patterns due to humans walking, the opening or closing of doors, etc. Temperature sensor interface 354 infers and modifies the measured temperature ($T_{measured}$) data 334 to remove sensor noise and compensate for any device internal heat exposure. Occupancy sensor interface 356 determines the reliability of the motion sensors (typically PIR sensors) located within smart thermostat 26 and remote sensors 34 and infers if the motion is caused by pets or humans. Human presence interface 350 is a machine vision module that determines who is in front of the camera (i.e., is this a authorized person or not) using facial recognition or body shape recognition.

The sensing inference 346 provides an instantaneous value for the environmental states and events that occur in premise 10. However, to make optimal decisions predictive autopilot program 320 needs to know how these states evolve in time and to predict future states given any changes in other environmental conditions. Predictive state module 360 takes the smoothed data from the sensing interface 346 and created predicted data for what it believes is the actual state within premise 10 using a predictive model. The predicted data typically comes from a machine learning-based model that is trained on a historical data set of the collected variables provided by environmental inputs 302. In the present embodiment, most predictive state modules 360 are trained on remote server 32 using historical data for premise 10 that is received over network 28, but depending on computational availability, model training may also be done on the local hub device itself. In the present embodiment, predictive state module 360 may include occupancy prediction model 362, activity recognition model 364, thermal comfort model 366, occupancy temporal model 368, temperature model 370 and humidity model 372.

Occupancy prediction model 362 determines the likelihood that someone is present in premise 10 using the smoothed data from any of phone presence interface 448, acoustic event interface 350, infrasound event interface 352, occupancy sensor interface 356 and human presence interface 358. An example of occupancy prediction model 362 is described above with reference to FIGS. 7A-7D.

Activity recognition model 364 attempts to determine what people in premise 10 are doing. For example, a high or rapid number of environmental inputs 302 from remote sensors 34 could suggest a high level of motion, exertion or physical activity. In contrast, low levels of environmental inputs 302 from remote sensors 34 could suggest that people have gone to sleep.

Thermal comfort model 366 is a prediction of human response to the either the measured temperature ($T_{measured}$)

or normalized humidex temperature (nHx), as described above. The input of thermal comfort model 366 are environmental inputs 302 such as indoor temperature, humidity, time of day, the season and the output is the probability that the person is thermally comfortable. Thermal comfort model 366 could be empirical such as the humidex index where it combines temperature and relative humidity into an effective temperature. By averaging humidex over historical data, a point of reference for premise 10 is obtained that can be compared against the current humidex value. If it is higher than the reference, occupants are likely uncomfortable and require lower temperatures and vice versa. Thermal comfort model 366 can also be trained using machine learning on historical data of people changing their temperature setpoint to accommodate their thermal comfort.

Temperature model 370 can predict the future indoor temperature within premise 10 given the current indoor temperature, the current and future HVAC runtime states and outside weather conditions. This model is trained on historical data set collected about the above variables. Humidity model 372 can predict the future indoor humidity within premise 10 given the current indoor humidity, the current and future HVAC runtime states and outside humidity. This model is trained on historical data set collected about the above variables.

The outputs of predictive state module 360, which may be stored in state estimation values 322, are then passed on to planner module 324, where decisions are made using the planner-modeller-optimizer loop described above with reference to FIG. 10. Those of skill in the art will recognize that the predictive autopilot program 320 can exist within different home automation agents, such as energy control program 100 and home monitoring program 200. Predictive autopilot program 320 can exist in other agents, such a light switch agent, mood lighting agent, blinds control agent, or hot-tub control agent (none depicted).

Without predictive autopilot program 320, either the device manufacturer or the user would need to specify many rules and settings for each possible environmental condition. An example would be if a person would like to adapt their smart thermostat 26 to optimize their premise 10 when subscribed to a time-of-use rate plan 54, where there is a high-cost peak period for four hours. The user would need to set a pre-cooling period prior to the peak time and a temperature setback during the high-cost peak period to force their HVAC system 20 to run at the cheap period and not be utilized at the high cost peak period. The duration and amount of the pre-cool necessary is a function of outside temperature and thermal properties of premise 10. It would be close to impossible for a user to choose an optimum amount of pre-cool every day of summer. In one embodiment of the present invention, energy control program 100 includes a predictive autopilot program 320 that can optimize for the goal function (cost) when the user is predicted to be away from premise 10 and optimize for the goal function (comfort) when the user is predicted to be home in presence 10. Since predictive module 320 includes the thermal comfort model 366, parameters such as humidity are factored into the temperature setpoint for smart thermostat 26 using the FLC 114 feature described above.

For energy control program 100, predictive autopilot program 320 controls smart thermostat 26 based on complete range of environmental inputs 302 captured by all devices, including remote devices 30, remote sensors 34, contact sensors 50 and smart camera 36. These devices provide environmental inputs 302 to allow occupancy prediction model 362 help identify occupancy state of premise 10. Occupancy values can be used in training the occupancy prediction model 362 to recommend changes to programming schedule 130 for different schedule periods 132. By modifying program schedule 130, predictive autopilot program 320 can automatically reduce HVAC consumption during away periods and recovers comfortable temperature settings prior to occupants arriving home at premise 10.

Predictive autopilot program 320 can also be used to improve the capabilities of home monitoring program 200. Predictive autopilot program 320 can also sends notifications (to remote devices 30) about the building security of premise 10. Since predictive autopilot program 320 perceives entrance and exit of each individual person and presence of humans in the home (using occupancy prediction module 362). It can notify authorized persons when they are not present, but an intruder occupancy is perceived. Predictive autopilot program 320 automatically adjusts its sensing interfaces 346 so that minimal false triggers occur and make the most optimal decision about notification. For example, consider that a mobile phone (remote device 30) disconnects from the local Wi-Fi network within premise 10. It may mean users have left premise 10 so that any motion sensor data 338 should be perceived as the intruder. However, the reliability of the phone (remote device 30) presence is not 100%. The phone (remote device 30) may have simply run out of battery power. The optimal choice here is to ensure not to notify the users until the predictive autopilot program 320 is confident the user has left premise 10 (i.e., additional presence data 330 appear). This waiting period needs to be learned for each premise 10 and each phone (remote device 30). This occurs in the Presence Prediction model. With predictive autopilot program 320 the user never needs to respond to arm the security system using a keypad or other device, yet alone set behaviour rules for their home monitoring system.

The above-described embodiments of the invention are intended to be examples of the present invention and alterations and modifications may be affected thereto, by those of skill in the art, without departing from the scope of the invention which is defined solely by the claims appended hereto.

What is claimed is:

1. A device for controlling at least one of a heating system and a cooling system within a premise, the device comprising:
 a housing;
 at least one relay within the housing, the at least one relay connected to the at least one of a heating system and a cooling system;
 at least one environmental sensor within the housing, operable to measure the temperature and humidity within the premise;
 memory, operable to store a programming schedule having at least one temperature setpoint and further operable to store current and historical temperature and humidity values provided by the at least one environmental sensor; and
 a processor, connected to the at least one relay, the at least one environmental sensor and the memory, the processor being operable to execute an energy control program; wherein
 the energy control program is operable to control the at least one of a heating system and a cooling system based upon one of the following control strategies: a first control strategy that compares the at least one temperature setpoint in the programming schedule to the current measured dry bulb temperature to determine whether to engage or disengage the at least one of a heating system and a cooling system, and a second control strategy that compares the at least one temperature setpoint in the programming schedule to a normalized humidex temperature to determine whether to engage or disengage the at least one of a heating system and a cooling system, the normalized humidex temperature being the current measured dry bulb temperature modified by historical humidity values to provide an indicator of thermal comfort within the premise; and the energy control program uses the second control strategy when the memory contains at least 72 hours of historical humidity values and uses the first control strategy when the memory contains less than 72 hours of historical humidity values.

2. The device of claim 1, wherein the energy control program is automatically able to select between the first control strategy and the second control strategy based upon a user preference setting stored in the memory.

3. The device of claim 1, wherein the energy control program is automatically able to select between the first control strategy and the second control strategy based upon a user preference setting stored in the memory, the user preference setting indicating whether the energy control program should optimize for energy savings or for user comfort.

4. The device of claim 1, wherein the energy control program is operable to receive current measured temperature values from at least one remote sensor located elsewhere in the premise and calculate a modified measured temperature value using the current measured temperature value form the at least one environmental sensor and the at least one remote sensor.

5. The device of claim 1, further comprising a display, and wherein the energy control program presents the current measured dry bulb temperature on the display when using the first control strategy and presents the normalized humidex temperature on the display when using the second control strategy.

6. The device of claim 1, wherein the energy control program is operable to automatically select the first control strategy when the current measured humidity is lower than a threshold and the second control strategy when the current measured humidity is higher than the threshold.

7. The device of claim 1, wherein the energy control program is operable to automatically select the first control strategy when the current measured humidity is higher than a threshold and the second control strategy when the current measured humidity is lower than the threshold.

8. The device of claim 1, wherein the energy control program is operable to modify the difference between the normalized humidex temperature and the current measured dry bulb temperature based upon a user preference setting stored in the memory.

9. The device of claim 1, wherein the energy control program is operable to automatically adapt and modify the difference between the normalized humidex temperature and the current measured dry bulb temperature based upon user overrides of the temperature setpoint stored in the programming schedule.

10. The device of claim 1, further including an occupancy sensor, the occupancy sensor being operable to provide an occupancy value, and wherein the energy control program is operable to automatically switch between the first control strategy and the second control strategy based upon the occupancy value.

11. The device of claim 1, the device being operable to receive an occupancy value from at least one remote sensor, and wherein the energy control program is operable to automatically switch between the first control strategy and the second control strategy based upon the occupancy value.

12. The device of claim 1, the device further being operable to receive a geofence signal from a remote device located within the premise, the geofence signal being operable to provide an occupancy value, and wherein the energy control program is operable to automatically switch between the first control strategy and the second control strategy based upon the occupancy value.

13. The device of claim 1, wherein the energy control program includes a user preference for a savings setting that when the savings setting is activated, the energy control program engages the at least one of the heating system and the cooling system only when both of the first control strategy and the second control strategy indicate that the at least one of the heating system and the cooling system should be engaged.

14. The device of claim 1, wherein the second control strategy for cooling the premise comprises: calculating a humidex temperature, the humidex temperature being the current measured dry bulb temperature modified by the current humidity values, calculating a humidex setpoint temperature, the humidex setpoint temperature being the current setpoint from the programming schedule modified by the historical humidity value, and engaging the at least one of the heating system and the cooling system when the humidex temperature is greater than the humidex setpoint temperature.

15. The device of claim 1, wherein the second control strategy for cooling the premise comprises: calculating a humidex temperature, the humidex temperature being the current measured dry bulb temperature modified by the current humidity values, calculating a humidex setpoint temperature, the humidex setpoint temperature being the current setpoint from the programming schedule modified by the historical humidity value, and engaging the at least one of the heating system and the cooling system when the humidex temperature is greater than the humidex setpoint temperature plus a humidex differential.

16. A device for controlling at least one of a heating system and a cooling system within a premise, the device comprising: a housing;

at least one relay within the housing, the at least one relay connected to the at least one of a heating system and a cooling system;

at least one environmental sensor within the housing, operable to measure the temperature and humidity within the premise;

memory, operable to store a programming schedule having at least one temperature setpoint and further operable to store current and historical temperature and humidity values provided by the at least one environmental sensor; and a processor, connected to the at least one relay, the at least one environmental sensor and the memory, the processor being operable to execute an energy control program; wherein the energy control program is operable to control the at least one of a heating system and a cooling system based upon one of the following control strategies: a first control strategy that compares the at least one temperature setpoint in the programming schedule to the current measured dry bulb temperature to determine whether to engage or disengage the at least one of a heating system and a cooling system, and a second control strategy that compares the at least one temperature setpoint in the programming schedule to a normalized humidex temperature to determine whether to engage or disengage the at least one of a heating system and a cooling system, the normalized humidex temperature being the current measured dry bulb temperature modified by historical humidity values to provide an indicator of thermal comfort within the premise; and the energy control program is operable to automatically select the first control strategy when the current measured humidity is higher than a threshold and the second control strategy when the current measured humidity is lower than the threshold.

17. The device of claim 16, wherein the energy control program is automatically able to select between the first control strategy and the second control strategy based upon a user preference setting stored in the memory.

18. The device of claim 16, wherein the energy control program is automatically able to select between the first control strategy and the second control strategy based upon a user preference setting stored in the memory, the user preference setting indicating whether the energy control program should optimize for energy savings or for user comfort.

19. The device of claim 16, wherein the energy control program is operable to receive current measured temperature values from at least one remote sensor located elsewhere in the premise and calculate a modified measured temperature value using the current measured temperature value form the at least one environmental sensor and the at least one remote sensor.

20. The device of claim 16, further comprising a display, and wherein the energy control program presents the current measured dry bulb temperature on the display when using the first control strategy and presents the normalized humidex temperature on the display when using the second control strategy.

21. The device of claim 16, wherein the energy control program is operable to modify the difference between the normalized humidex temperature and the current measured dry bulb temperature based upon a user preference setting stored in the memory.

22. The device of claim 16, wherein the energy control program is operable to automatically adapt and modify the difference between the normalized humidex temperature and the current measured dry bulb temperature based upon user overrides of the temperature setpoint stored in the programming schedule.

23. The device of claim 16, further including an occupancy sensor, the occupancy sensor being operable to provide an occupancy value, and wherein the energy control program is operable to automatically switch between the first control strategy and the second control strategy based upon the occupancy value.

24. The device of claim 16, the device being operable to receive an occupancy value from at least one remote sensor, and wherein the energy control program is operable to automatically switch between the first control strategy and the second control strategy based upon the occupancy value.

25. The device of claim 16, the device further being operable to receive a geofence signal from a remote device located within the premise, the geofence signal being operable to provide an occupancy value, and wherein the energy control program is operable to automatically switch between the first control strategy and the second control strategy based upon the occupancy value.

26. The device of claim 16, wherein the energy control program includes a user preference for a savings setting that when the savings setting is activated, the energy control program engages the at least one of the heating system and the cooling system only when both of the first control strategy and the second control strategy indicate that the at least one of the heating system and the cooling system should be engaged.

27. The device of claim 16, wherein the second control strategy for cooling the premise comprises: calculating a humidex temperature, the humidex temperature being the current measured dry bulb temperature modified by the current humidity values, calculating a humidex setpoint temperature, the humidex setpoint temperature being the current setpoint from the programming schedule modified by the historical humidity value, and engaging the at least one of the heating system and the cooling system when the humidex temperature is greater than the humidex setpoint temperature.

28. The device of claim 16, wherein the second control strategy for cooling the premise comprises: calculating a humidex temperature, the humidex temperature being the current measured dry bulb temperature modified by the current humidity values, calculating a humidex setpoint temperature, the humidex setpoint temperature being the current setpoint from the programming schedule modified by the historical humidity value, and engaging the at least one of the heating system and the cooling system when the humidex temperature is greater than the humidex setpoint temperature plus a humidex differential.

* * * * *